United States Patent [19]
McClelland et al.

[11] Patent Number: 5,689,650
[45] Date of Patent: Nov. 18, 1997

[54] COMMUNITY REINVESTMENT ACT NETWORK

[76] Inventors: Glenn B. McClelland, 5 Sylvan La., Old Greenwich, Conn. 06870; Richard D. Levinson, 28 Furnace Woods Rd., Cortlandt Manor, N.Y. 10566; Judith S. Sloan, 26 Leslie Pl., New Rochelle, N.Y. 10804

[21] Appl. No.: 393,423

[22] Filed: Feb. 23, 1995

[51] Int. Cl.$^6$ .................................................. G06F 17/60
[52] U.S. Cl. ................................................... 395/236
[58] Field of Search ........................... 364/401 R; 395/236

[56] References Cited

U.S. PATENT DOCUMENTS

| | | |
|---|---|---|
| 4,346,442 | 8/1982 | Musmanno . |
| 4,739,478 | 4/1988 | Roberts et al. . |
| 4,751,640 | 6/1988 | Lucas et al. . |
| 4,799,156 | 1/1989 | Shavit et al. . |
| 4,876,648 | 10/1989 | Lloyd . |
| 4,885,685 | 12/1989 | Wolfberg et al. . |
| 4,910,676 | 3/1990 | Alldredge . |
| 4,933,842 | 6/1990 | Durbin et al. . |
| 5,025,372 | 6/1991 | Burton et al. . |
| 5,101,353 | 3/1992 | Lupien et al. . |
| 5,126,936 | 6/1992 | Champion et al. . |
| 5,193,056 | 3/1993 | Boes . |
| 5,220,500 | 6/1993 | Barid et al. . |
| 5,237,500 | 8/1993 | Perg et al. . |
| 5,262,942 | 11/1993 | Earle . |
| 5,272,623 | 12/1993 | Grubb et al. . |
| 5,291,398 | 3/1994 | Hagan . |
| 5,297,031 | 3/1994 | Gutterman et al. . |
| 5,297,032 | 3/1994 | Trojan et al. . |

OTHER PUBLICATIONS

Colby, Mary "Gearing up for the next round of mortgage lending scrutiny", Bank Management, Apr. 1993, pp. 46–52.
FannieMae FannieMaps®0 1993.

Policy Essay, "New Tools for Regulators in a High–Tech World," Federal Reserve Bank of Atlanta, *Economic Review*, Mar./Apr. 1993.
Pamphlet, "Catalog of HUD Directives," Mar., 1994.
FannieMae Fact Sheet, Fannie 97$^{SM}$"A Community Home Buyer's Program Mortgage".

(List continued on next page.)

*Primary Examiner*—Donald E. McElheny, Jr.
*Attorney, Agent, or Firm*—Howrey & Simon; Thomas J. Scott, Jr.

[57] ABSTRACT

The CRA apparatus compiles investor needs for CRA qualified assets, creates portfolios of assets that would be recognized by regulatory agencies as meeting the requirements of the CRA and allocates CRA credits separately from the financial return of the portfolio of assets. The CRA apparatus can acquire CRA eligible loans from the secondary market, directly from private or governmental agencies, and/or directly from loan originators. The CRA apparatus determines whether an asset meets CRA qualifying parameters from demographic and statistical data regarding the borrower and/or the financial asset. The apparatus determines, by using CRA qualification factors as well as investor requirements, whether a loan should be acquired. In a parallel accounting process, the apparatus creates a pool of CRA eligible "credits" from the assets in each portfolio and then tracks and allocates specific CRA credits associated with specific assets to specific portfolio investors. This allocation of CRA credits creates specific "CRA interests" for each investor. These interests would be recognized by regulatory agencies as meeting the requirements of the CRA. The invention can provide a complete audit trail for the allocation of CRA interest and can generate the information necessary to comply with all regulatory reporting requirements. The CRA apparatus allows investors to obtain and report geographically specific CRA interests while participating in a diversified, risk managed portfolio.

58 Claims, 11 Drawing Sheets

| ASSET ID 400 | SMSA 402 | ASSET TYPE 404 | ADDRESS OF REAL PROPERTY 406 | ADDRESS OF STUDENT LOAN BORROWER 408 | | |
|---|---|---|---|---|---|---|
| SMALL BUSINESS ADDRESS 410 | RATE 412 | FIXED/ FLOATING 414 | QUALIFYING PROGRAM 416 | AMOUNT 418 | | |
| MATURITY DATE 420 | RISK WEIGHT 422 | CRA ELIGIBILITY 426 | ALLOCATION INVESTOR A 428 | LOCAL 430 | NATIONAL 432 | |
| ALLOCATION INVESTOR B 434 | LOCAL 436 | NATIONAL 438 | ALLOCATION INVESTOR C 440 | LOCAL 442 | NATIONAL 444 | |
| ALLOCATION INVESTOR D 446 | LOCAL 448 | NATIONAL 450 | ALLOCATION INVESTOR E 452 | LOCAL 454 | NATIONAL 456 | |
| ALLOCATION INVESTOR F 458 | LOCAL 460 | NATIONAL 462 | ALLOCATION INVESTOR G 464 | LOCAL 466 | NATIONAL 468 | |
| NOT DEFINED 470 | NOT DEFINED 472 | NOT DEFINED 474 | NOT DEFINED 476 | | | |

OTHER PUBLICATIONS

FannieMae Fact Sheet, "Fannie Mae's Start-Up Mortgage$^{SM}$".

FannieMae Fact Sheet, "FannieNeighbors® with the Community Home Buyer's Program".

FannieMae Fact Sheet, "Fannie Mae's HomePath$^{SM}$ and Public Information Office".

FannieMae, "Enhanced FannieNeighbors$^{SM}$ with the Community Home Buyer's Program," 1993.

FannieMae, "Central Cities for Enhanced FannieNeighbors$^{SM}$ with the Community Home Buyer's Program," 1993.

FannieMae, "Fannie 97$^{SM}$, a Community Home Buyer's Program Mortgage," Nov., 1994.

FannieMae, "Guide to Community Lending and Neighborhood Products," 1993.

"Discover Gold Through Expanding Markets," Freddie Mac, 1994.

*Regulation BB–Community Reinvestment*, 12 CFR 228, as amended effective Jul. 11, 1991, pp. 1–9.

"Community Reinvestment Act Regulations; Proposed Rule (First Proposed Revision)," *Federal Register*, vol. 58, No. 243, Dec. 21, 1993, pp. 67466–67508.

Staff (Federal Reserve System), "CRA Reform (Second Proposed Revision)," *Memorandum* to Board of Governors, Sep. 22, 1994, pp.1–181 (including Attachments A–D).

"Community Reinvestment Act Regulations (Regulation BB)—Draft Final CRA Revisions," *Staff Memorandum to Board of Governors*, Apr. 13, 1995, pp. 1–225 (including Attachments A–E).

Janice A. Booker, *Re: Final Rule*, 6 pages (including Federal Register version pp. 1–44), Apr. 18, 1995.

Department of Treasury, *Statement of Secretary Rubin on CRA Reform* (Press Release), Apr. 19, 1995, 1 page.

Department of Treasury, *Remarks of Deputy Secretary Frank Newman* . . . (Press Release), Apr. 19, 1995, pp. 1–3.

The White House, *Statement of the President*, Apr. 19, 1995, 1 page.

Office of Thrift Supervision, *OTS Joins Other Regulators In Approving New CRA Rule*, Apr. 19, 1995, 1 page.

Dept. of Housing and Urban Development, *Statement by Secretary Henry G. Cisneros*, (not dated), 1 page.

Freddie Mac, "Freddie Mac Affordable Housing Initiatives Information Summary," *Affordable Facts*, (Mar. 1994), pp. 1–5.

Freddie Mac, "Affordable Gold Program Detailed Summary," *Affordable Facts*, (Apr. 1994), pp. 1–3.

Fannie Mae, "Mortgage-Backed Securities," 1991, 20 pages.

Sniderman, Mark S., "Issues in CRA Reform," *Economic Commentary* (Federal Reserve Bank of Cleveland), (Mar. 1994), 6 pages.

Spectrum Services, Inc., "CENTRAX—The Proposed New CRA Format," 1994, pp. 1–23.

Peirce, Neal R. et al., "Market Standards, Community Dividends," *A Report to the National Academy of Public Administration*, Feb. 1994, 59 pages.

Ferlauto, Richard et al., "Economically Targeted Investments By State-Wide Public Pension Funds," *The Center for Policy Alternatives Report*, Sep. 1993, 57 pages.

Stevens, Judy et al., "Lenders of First Resort: Community Development Loan Funds," *Woodstock Institute Report*, Aug. 1991, 55 pages.

Tholin, Kathryn, "Community Development Financial Institutions: Investing in People and Communities," *Woodstock Institute Report*, Jul. 1994, 26 pages.

Vidal, Avis C., "Rebuilding Communities: A National Study of Urban Community Development Corporations—Executive Summary," *Community Development Research Center Report* (New School for Social Research), 1992, 25 pages.

Peterson, George E. et al., "Corporations as Partners in Strengthening Urban Communities—A Research Report" (Report No. 1079-94-RR), *The Conference Board, Inc.*, 1994, 46 pages.

The National Community Reinvestment Coalition, *NCRC Reinvestment Compendium*, vol. 1, No. 1, May/Jun. 1994.

Rosenthal, James A. et al., *Securitization of Credit*, (John Wiley & Sons, Inc., New York), 1988.

Zweig, Phillip L. (ed.), *The Asset Securitization Handbook*, (Dow Jones-Irwin, Homewood, Illinois), 1989.

FIG. 2

| INVESTOR NAME 50 | ADDRESS 52 | STATE 52 | ZIP CODE 52 | LOCAL CRA REQUIREMENT 54 | REGIONAL OR NATIONAL CRA REQUIREMENT 56 |
|---|---|---|---|---|---|
| PORTFOLIO CATEGORY 58 | 1-4 FAMILY MORTGAGE 60 | | MULTIFAMILY MORTGAGE 62 | SMALL BUSINESS LOAN 64 | HOME EQUITY LOAN 66 |
| STUDENT LOAN 68 | INVESTMENT AMOUNT 72 | | PURCHASE DATE 74 | SELL DATE 76 | |

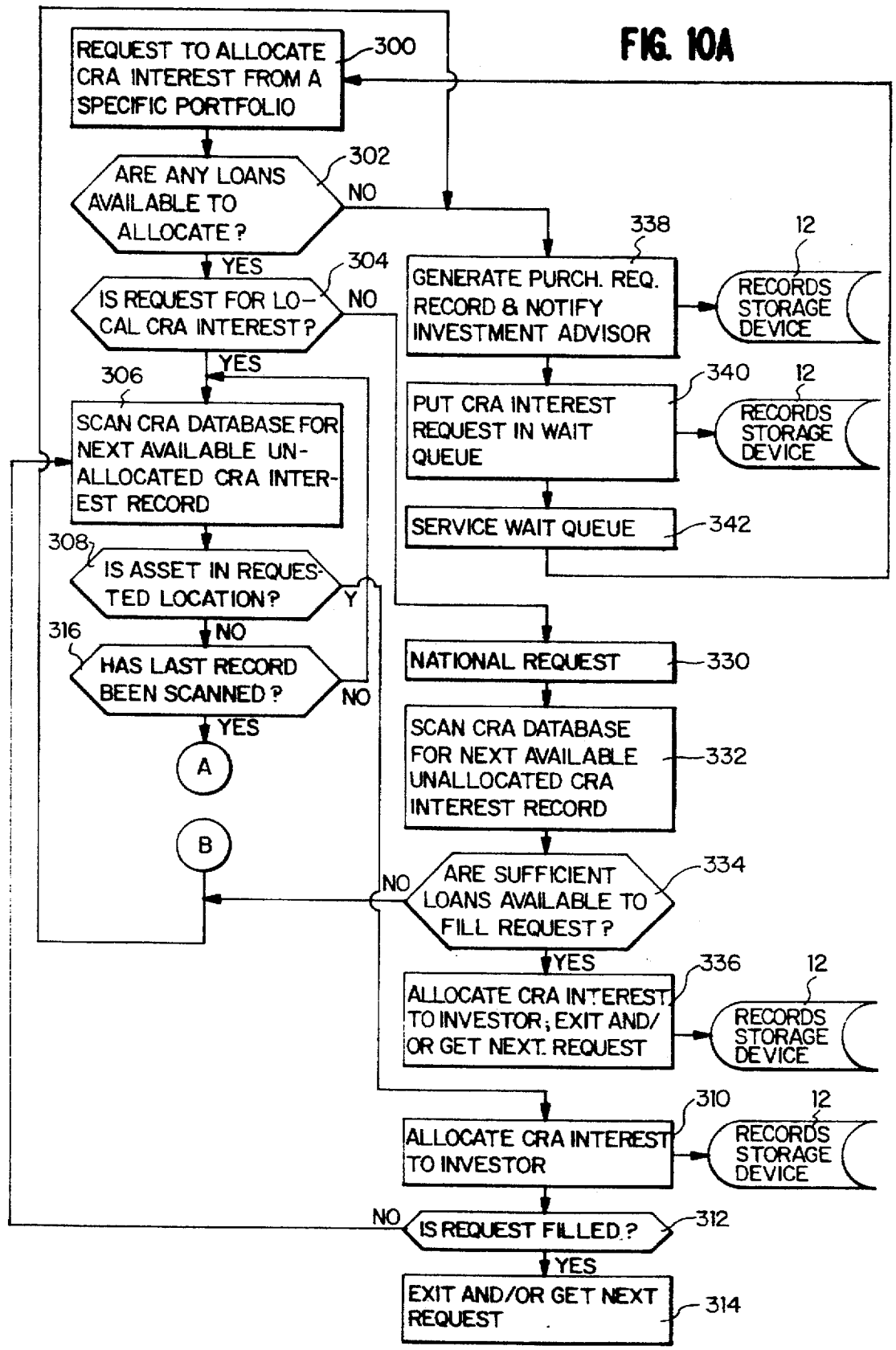

FIG. 11

| ASSET ID 400 | SMSA 402 | ASSET TYPE 404 | ADDRESS OF REAL PROPERTY 406 | ADDRESS OF STUDENT LOAN BORROWER 408 |
|---|---|---|---|---|
| SMALL BUSINESS ADDRESS 410 | RATE 412 | FIXED/ FLOATING 414 | QUALIFYING PROGRAM 416 | AMOUNT 418 |
| MATURITY DATE 420 | RISK WEIGHT 422 | CRA ELIGIBILITY 426 | ALLOCATION INVESTOR A 428 | LOCAL 430 / NATIONAL 432 |
| ALLOCATION INVESTOR B 434 | LOCAL 436 / NATIONAL 438 | ALLOCATION INVESTOR C 440 | LOCAL 442 | NATIONAL 444 |
| ALLOCATION INVESTOR D 446 | LOCAL 448 / NATIONAL 450 | ALLOCATION INVESTOR E 452 | LOCAL 454 | NATIONAL 456 |
| ALLOCATION INVESTOR F 458 | LOCAL 460 / NATIONAL 462 | ALLOCATION INVESTOR G 464 | LOCAL 466 | NATIONAL 468 |
| NOT DEFINED 470 | NOT DEFINED 472 | NOT DEFINED 474 | NOT DEFINED 476 | |

COMMUNITY REINVESTMENT ACT NETWORK

BACKGROUND OF THE INVENTION

This invention relates to financial systems and in particular to a network of data processes which may create diversified portfolios of eligible assets through which investors can earn market returns and obtain a cognizable interest in a particular asset in said portfolio while receiving the diversified risk benefits of a plurality of assets. A cognizable interest is herein defined as a legally ascertainable right or claim that is separable from mere ownership. More specifically, this invention relates to financial systems and in particular to a network of data processes which may create diversified portfolios of Community Reinvestment Act (CRA) eligible assets through which investors can earn market returns and obtain CRA interests. This invention is further directed to a method and apparatus for establishing individual portfolios, matching CRA eligible assets within a portfolio to investor requirements, allocating CRA interests to specific investors and calculating the returns and average risk weight of each portfolio.

The Congress enacted the CRA in 1977 to encourage banks and thrifts to meet the credit needs of their entire communities including low and moderate income (LMI) areas. The CRA requires a regulated financial institution to delineate the community that comprises its operating area. The regulatory process establishes CRA compliance for, among other things, loans held by a regulated financial institution that fit the criteria of the CRA regulations and are located within the institution's delineated operating areas.

In acquiring assets that fulfill their CRA obligations, regulated financial institutions may have several objectives: extending credit to LMI borrowers; maintaining safety and soundness standards; and earning appropriate risk adjusted returns. If not managed correctly, these objectives may conflict with one another.

Many regulated financial institutions balance these objectives by conducting their CRA activity outside normal banking channels or as special or exceptional activities within normal banking channels. However, financial markets have changed dramatically since CRA's enactment. Many retail lending markets are now dominated by secondary markets, generalists have given way to specialists and rate volatility has made consumer lending (and especially mortgages) far riskier. It is extremely difficult for many institutions to prudently meet their CRA requirements through the traditional means of originating and holding portfolios of individual loans.

The creation of the Federal Housing Administration (FHA) in 1934 in response to the great Depression was the forerunner of a group of government agencies such as the Government National Mortgage Association (GNMA), the Federal National Mortgage Association (FNMA), and the Federal Home Loan Mortgage Corporation (FHLMC) responsible for creating a growing secondary market for mortgages. These agencies buy qualifying residential mortgages from lenders, package the mortgages into securities backed by the cash flows from those mortgages, provide certain guarantees, and then resell the securities on the open market. Similarly, in the student loan market, the Student Loan Marketing Association (SLMA), a government sponsored publicly traded stock corporation, purchases and finances student loans bought from originating financial institutions.

Over time, other public and private entities have entered the market in a variety of roles. The secondary market for asset backed securities is large and continues to grow. Lenders are motivated to sell the loans they originate to build liquidity and support additional lending, to remove assets from their balance sheets and free up capital reserves, and to diversify their investor base. These advantages have caused the traditional banking model of originating and holding assets to be augmented by one where assets are sold to the secondary market.

The realities of modern financial markets, however, can be inconsistent with the CRA's best intentions. An example of this divergence may arise because CRA eligible loans are "lost" to the originating institution, in terms of CRA compliance, when the loans are sold. Moreover, the CRA eligible asset may be difficult to "recapture" because once a single desirable loan is bundled into a security, it cannot be repurchased individually, but only as part of that security. Very often the bundled security also includes assets that are CRA qualifying but outside an institution's geographic operating area or simply are not CRA eligible loans.

Many smaller institutions, wholesale or limited purpose institutions, and domestic subsidiaries of foreign banks are subject to the CRA but may have limited ability to originate and manage CRA eligible assets. They may not actively participate in the loan business and often lack the capacity to diversify their asset base over a wide geography. The result for these institutions may be an undue concentration of risk as a tradeoff for CRA compliance. Unit banking state holding companies that own many very small subsidiaries can also incur substantial costs through the need to originate qualifying assets in each subsidiary.

Thus, there is a need to assist regulated financial institutions in acquiring and managing CRA eligible assets. More specifically, there is a great need to be able to identify geographically targeted CRA assets and to allocate specific CRA interests to specific institutions. While there exists a multitude of fund arrangements in the financial arts, nowhere is there a method or apparatus that either teaches or suggests a means for allocating CRA interests. For example, U.S. Pat. No. 5,262,942 describes a financial transaction network for users to conduct commercial transactions with mutual fund shares instead of currency. The system offers the benefit of replacing "cash" (hard currency) transactions with a medium of exchange (e.g., mutual fund shares) that continuously earn interest at a money market rate. U.S. Pat. No. 5,193,056 discloses a partnership portfolio and partner fund (hub and spoke) financial services configuration. This system makes a daily allocation of assets of two or more funds (spokes) that are invested in a portfolio (hub). And U.S. Pat. No. 4,933,842 discloses a mutual fund system that allows transactions to be recorded and "fixed" while the fund unit/dollar ratio is unknown. This system retroactively evaluates the previously recorded transaction when the unit/dollar ratio for that time becomes known. None of these systems or methods contemplate, teach or suggest a means for allocation of CRA interests.

There also exist systems to create hybrid investment assets. For example, U.S. Pat. No. 4,876,646 discloses a mortgage that is partially collateralized by an interest sensitive investment vehicle. This creates a mortgage that is less sensitive to interest rate fluctuations. The mortgagee "sees" a mortgage that fluctuates a small amount (an almost "fixed rate" mortgage) from interest rate fluctuations because the mortgage payment is partially offset by the collateralization of the interest sensitive investment. The mortgage holder "sees" a mortgage that has a variable rate of return (a "variable rate" mortgage) because the collateralization by the interest sensitive investment changes the amount the mortgage pays the holder in direct proportion to interest rate fluctuations. This type of hybrid mortgage neither teaches nor suggests a means for allocating CRA or any other cognizable interests.

There exists a host of other methods and apparatus in the financial arts such as: U.S. Pat. No. 4,739,478 which discloses a method for restructuring debt obligations issued in the form of interest-bearing bonds, whether in registered form or in bearer form, into a serial issue of zero coupon bonds which provide a series of cash payments that is commensurate with the scheduled cash payments of the interest-bearing bond(s); Quasi-markets or trading pools, such as, U.S. Pat. No. 5,126,936 which discloses a system that determines a net position change of a pool of investors which is translated into aggregate purchase/sale orders for various market index futures contracts; Commercial transaction service providers, such as, U.S. Pat. No. 4,799,156 which discloses a system for interactive on-line electronic communications and processing of business transactions between sellers, buyers, financial institutions, and freight service providers; Automated annuity custodian assistants, such as, U.S. Pat. No. 5,291,398 which discloses a method for processing transactional data and monitoring annuity funds to ensure compliance with federal regulations and the terms of the annuity contract; Methods to create complex Federal Government contracts, such as, U.S. Pat. No. 5,272, 623, assigned to the United States Navy, which discloses a method for producing contracting documents that have the correctly selected Government Agency Regulation clauses; Systems to peg the "dollar" to the cost of a "basket of goods" or inflation index, such as, U.S. Pat. No. 5,237,500 which discloses a system and process for converting constant dollar financial instruments into an equivalent nominal dollar instrument. A constant dollar is a nominal dollar multiplied by an inflation index. Systems that allow the graphical representation and programming of investment models, such as, U.S. Pat. No. 5,220,500 which discloses a system that allows a user to create and modify a model of an investment strategy to be applied to data pertaining to a set of possible investment entities; Systems that combine a cash management system with other features, such as, U.S. Pat. No. 4,885,685 which discloses a method of combining a cash management type system, disclosed in U.S. Pat. No. 4,326, 422, with a frequent flyer mileage scheme to allow an investor to realize a rate of return on an initial investment while financing and tracking investment expenditures used for travel; and Finally, there are workstation applications for use as data presentation systems for stock and bond traders, such as, U.S. Pat. No. 5,297,032 which discloses a workstation integrated into a network of competing market makers for displaying a plurality of securities for trading and U.S. Pat. No. 5,297,031 which discloses a broker workstation for managing orders in a market for trading commodities, securities, securities options, futures contracts, and futures options.

Nowhere in the art is there any teaching or suggestion of a method or apparatus that distributes the risk of a pool of assets while simultaneously distributing a cognizable interest in a particular asset to a particular investor. Nowhere in the art is there any teaching or suggestion of a method or apparatus that simultaneously allocates economic returns on an undivided interest basis and CRA interests on a geographic basis. Nowhere in the art is there a method or apparatus for identifying the amount of CRA interest available in a security or a loan. Nowhere in the art is there a method or apparatus for meeting investor CRA requirements through the creation of portfolios of CRA qualified assets. And nowhere in the art is there a method or apparatus that is capable of addressing the issue of allocating CRA interests to participants in a risk managed portfolio.

SUMMARY OF THE INVENTION

The invention is a method and apparatus to create a CRA distribution network. The CRA network (the "network") provides investment opportunities in diversified and risk managed portfolios of assets and simultaneously allocates CRA interests from qualifying assets to portfolio investors. Each portfolio or pool of assets may include a single category of CRA eligible loans. The CRA network may buy CRA qualified loans in the secondary market and/or work with private or governmental agencies to originate securities backed by qualifying assets. Loan characteristics are identified by the network and may include LMI status, zip codes, geographic location, rate of return, risk factors and the like. Investor needs, CRA qualifying factors and loan characteristics may determine whether an asset is CRA eligible and desirable for the network's acquisition. The network may purchase as well as sell securities and/or loans to produce an optimal portfolio which is booked on the CRA system.

Participants may invest in specific portfolios and the network may allocate CRA interests from each portfolio to specific investors. The network may track and store the data necessary to create or reconstruct, if necessary, a complete audit trail for each CRA interest. The network may use separate accounting systems to allocate credit risk and CRA interests. Investors in each portfolio may incur credit risk (and earn returns) on an undivided basis. That is, they may hold proportionate shares in a nationally or regionally diversified portfolio. However, for CRA purposes, each institution's investment may be directly linked to portfolio assets originated in its delineated operating area. This dual accounting process may enable a financial institution to meet its CRA requirements while avoiding undue credit concentrations in small geographic areas.

Investor information, CRA information and loan information may be collected, stored, analyzed and allocated by a computerized process called the CRA accountant. Information on each loan and each investor may also be collected by another computerized process called He financial accountant. The financial accountant may calculate the returns, maintenance costs, risk weights and the like of each portfolio. The investment advisor, using information from the CRA accountant and the financial accountant, buys or sells particular loans to meet portfolio risk parameters and a desired CRA distribution. Another computerized process provides the user interface for the network and may also serve as a link between investor CRA requirements and the investment advisor's fulfillment of those requests. Using these processes, the present invention may (1) calculate and distribute the financial return on a pool of assets to the shareholder account(s) and (2) calculate CRA interests available from the pool of assets and independently distribute the CRA interests to the shareholder account(s). It is understood that the scope of the present invention is not limited to the CRA, but, covers any statutory, regulatory, policy, and/or private contingency that requires a cognizable interest from a particular asset to be allocated to a particular investor. One additional example of such a cognizable interest may be investment in "Economically Targeted Investments (ETIs)" in specific geographic locations such as that sought by pension plans, foundations, endowments, and/or charitable trusts. Another example may be investment in a credit diversified pool of cross border loans, which allows a separate and distinct assignment of a cognizable interest in "Withholding Tax Credits (WTCs)," associated with the loans.

BRIEF DESCRIPTION OF THE DRAWINGS

FIG. 2 is a block diagram showing the data fields of a CRA transaction record that may be displayed on a network control terminal. The record shown depicts the data fields used to track such things as the investor's name 50, address 52, local CRA interest requirement 54, regional or national CRA interest requirement 56, the investment portfolio category 58, the investment amount 72, the purchase date 74, and a sell date 76.

FIG. 11 is a block diagram showing the data fields that may be used in an asset data record of the present invention. The record shown may be used to track such things as the asset identification 400, the standard metropolitan statistical area associated with the loan address (in 406, 408 or 410) 402, the asset type 404, e.g., 1-4 family housing, student loan, Small business loan, and the like, the address of the real property 406 if the loan is for real property, the address of the borrower 408 if the asset is a student loan, the small business address 410 if the loan is a small business loan, the interest rate 412 of the loan, whether the rate is fixed or floating 414, what program the loan qualified under 416 if appropriate (for example, the FNMA Community Home Buyer's Program), the loan amount 418, the loan maturity date 420, the risk weight 422 associated with the loan, whether the asset is CRA eligible 426, and an investor to whom the CRA interest is allocated 428, what amount of the CRA interest is allocated as local CRA interest 430, and what amount of the CRA interest is allocated as national CRA interest 432. It is understood that the additional investor allocation data fields 434-468 may be used to indicate a CRA interest allocation to other investors, e.g., a particular asset's total cognizable interest may be divided among several investors so long as the allocation does not exceed 100% of the cognizable interest available from a particular asset. Thus, each asset's CRA interest can be linked to a particular investor or investors. It is understood that additional data fields 470-476 may be used to track additional information, such as the cognizable interest available from ETIs and WTCs.

DETAILED DESCRIPTION OF THE PREFERRED EMBODIMENT

Network Overview and Portfolio Structure

Figure 1:
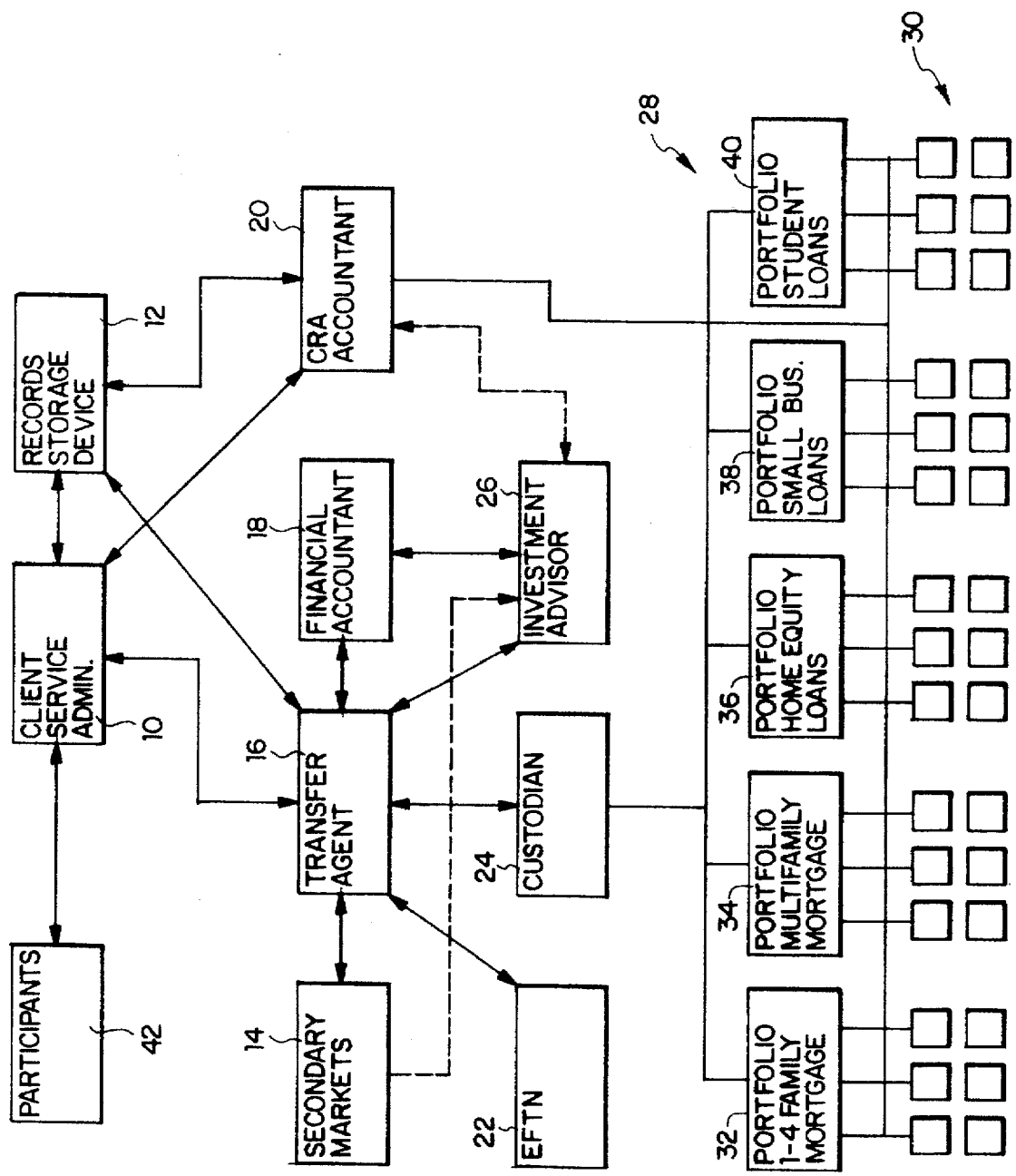
FIG. 1 is a schematic diagram of the CRA transaction apparatus showing network participants 42, the client service administrator 10, the records storage device 12, the network's telecommunications link to secondary markets 14, the transfer agent 16, the financial accountant 18, the CRA accountant 20, the telecommunication link to the electronic funds transfer network (EFTN) 22, the portfolio custodian 24, the investment advisor 26, and a plurality of possible CRA portfolios 28 and the underlying assets 30.

The CRA network assembles desired assets into separate portfolios on behalf of its investors. A portfolio is essentially a pool of assets. On a financial basis, investors may hold undivided interests in a specific portfolio or mix of portfolios. Each investor may share in the portfolio's returns and risks in proportion to their share of the portfolio. In addition, the network may maintain a parallel CRA accounting system, on an information basis, for the purpose of allocating CRA interests to investors. The CRA accounting process may allocate specific CRA interests associated with specific assets to specific investors.

The network is open both to investors who are subject to the CRA as well as those who are not, such as pension funds, foundations, endowments and other investors seeking good quality economically targeted investments. Investors who require and request CRA interests, such as banks and thrifts, may receive specific allocations of CRA interest. Investors who do not request CRA interests may participate in the returns of a socially conscious fund that serves community needs but may receive no special CRA allocations.

The network may also allow participants to make in-kind investments. That is, investors may contribute CRA assets instead of cash. This enables an institution to maintain its level of CRA eligible assets while diversifying its credit exposure. Investors may also move their network investments, booked on the system, among portfolios with sufficient notice.

The network may follow "call report" accounting criteria to allow regulated investors to participate in the CRA network and properly report their investments. The CRA network may also calculate and report the average risk weight of each portfolio. Investors may use these risk weights in their regulatory capital calculations.

The CRA network may establish and maintain different portfolios. Each portfolio may be structured as an investment company (whether registered under the Investment Company Act of 1940 or exempt therefrom), a trust, a limited liability corporation, a limited partnership, a general partnership, a limited liability partnership, a mutual fund, a real estate mortgage investment conduit (REMIC), an unincorporated association or any other legal financial structure. Each portfolio may include a single category of CRA eligible loans. The types of portfolios and their size may change over time depending upon market conditions, investor demand and CRA standards. It is within the scope of the present invention to create one or more portfolios and to develop new portfolios of assets which may become CRA eligible depending on regulatory changes and/or regulatory interpretation.

Investors may choose the portfolio(s) that best meet their needs and the needs of their communities. The different portfolios may include but are not limited to: 1–4 family residential mortgages; multifamily mortgages, home equity loans, small business loans; and student loans. The network may purchase these assets in the secondary markets and/or work with private or governmental agencies to originate securities backed by qualifying assets and book them on the CRA system once acquired.

The CRA network may form the portfolios in several ways. The first portfolio formation method may identify investors before they commit funds to the network and before investor specific assets are acquired. Prior to investment, potential participants may specify a "buy date" (indicated on the CRA transaction record) on or before which they would like to acquire shares in the network. This gives the CRA network time to identify CRA eligible assets and synchronize the network's purchase of the asset with the investor's transfer of funds to the network.

The second method of portfolio formation may receive an investor's funds before the network has identified and acquired CRA assets that satisfy the investor's specific requirements. The CRA network may, in this method, hold funds in a dedicated sub-account invested in short term assets and apportion any return on those short term assets to the investors until the network obtains the desired CRA assets. The network may accommodate this second method of portfolio formation by creating and placing an investor's CRA interest request into a wait queue and processing portfolio share and CRA interest transactions once investor specific assets are acquired.

A third method of portfolio formation may be used when the network owns an asset before an investor is identified and transfers funds to the network. The network will finance these assets through repurchase agreements or other borrowing mechanisms. These portfolio assets may contribute to the overall financial return of the portfolio and may or may not have CRA interests allocated. This third method may be accommodated by the CRA network giving priority to distributing financial interest and unallocated CRA interest from assets owned by the network to new investors before the network seeks to acquire new assets.

Asset Eligibility, Criteria

Any home loan initiated under an affordable housing program sponsored by FNMA, GNMA, the Federal Housing Authority, state or local housing authorities, licensed mortgage insurers, commercial banks, savings and loans or any other licensed mortgage lender may be eligible for inclusion in the network. Small business loans may be purchased from any licensed lender, secondary market intermediary or insurer. Student loans may be originated by any "eligible lender" as defined by the Higher Education Act of 1965, as amended. Loans in the network may be purchased through these channels and/or any other available source. All loans, regardless of their source, may comply with the network's eligibility standards. These guidelines afford the network maximum flexibility in acquiring and selling assets yet assure that loans in the network fulfill CRA goals. It is understood that CRA eligibility criteria may change and that such changes are within the scope of the present invention. Moreover, it is understood that implementation of other regulatory and statutory programs, although not yet created, may benefit from the dual interest allocation method of the present invention and such use is within the scope of the present invention. The network's asset eligibility criteria may be reviewed at least annually and adjusted as necessary based on market trends. Current network eligibility standards are as follows:

1–4 Family Residential Mortgages

The CRA network may purchase any loan originated in accordance with the underwriting standards defined by the FNMA Community Home Buyer's Program, the Fannie-Neighbors Mortgage Program, the FHLMC (Federal Home Loan Mortgage Corporation or FreddieMac) Affordable Gold Program, or any other program or standard that meets CRA regulatory guidelines for inclusion in the 1–4 family residential mortgage portfolio. In addition, the network may purchase any loan originated under an approved modification, enhancement or successor to these programs and may also buy other loans originated under comparable standards to these programs. The network may also accept any other agency or non-agency loan originated with equivalent or more aggressive standards (e.g., a higher loan to value ratio, a higher debt burden ratio, no mortgage insurance requirement and the like) designed to enhance LMI accessibility to credit. An example of criteria that may be used to qualify a loan for the FNMA Community Home Buyer's Program is shown in Table 1. It is understood that these criteria may evolve with changing market and regulatory conditions. It is further understood that individual loans may deviate from these standards based on underwriter judgment.

TABLE 1

| | FNMA Community Home Buyer's Program |
|---|---|
| PROGRAM DESCRIPTION: | This is an agency program designed to meet the needs of low and moderate income borrowers by providing flexibility to standard underwriting guidelines while being consistent with safe and sound lending practices. |
| GEOGRAPHICS: | All states |

TABLE 1-continued

FNMA Community Home Buyer's Program

| | |
|---|---|
| SOURCING: | Channels |
| | Branch/Realtor |
| | Broker |
| | Community Development Corporations |
| | Corporate |
| | Nonprofit Organizations |
| | Telesales |
| LOAN PURPOSE: | Purchase |
| | Rate and Term Refinance |
| OCCUPANCY: | Primary residence |
| | The borrower(s) may not own any property as of the mortgage application date except for the subject property being refinanced. |
| PROPERTY TYPES: | 1-Family |
| | Condominiums |
| | Planned Unit Developments (PUDs) |
| | Townhouses |
| | 2-Family |
| AVAILABLE PRODUCTS: | 15 Year Conforming Fixed Rate |
| | 30 Year Conforming Fixed Rate |
| AMORTIZATION TERM: | 15, 20 and 30 year terms |
| LOAN AMOUNTS: | Number of Units    Minimum    Maximum |
| | 1 Unit                     none         $203,150 |
| | 2 Units                   none         $259,850 |
| LOAN-TO-VALUE: | |

|          | PURCHASE | | RATE AND TERM REFINANCE | |
|----------|------|------|------|------|
| Property | LTV  | CLTV | LTV  | CLTV |
| 1-Family | 95%  | 95%* | 90%  | 90%  |
| 2-Family | 90%  | 90%  | 90%  | 90%  |

*97% permitted on 3/2 Option where the 2% portion is obtained as secured financing.
3/2 Option - See Downpayment.
LTV—Loan To Value
CLTV—Combined Loan To Value

| | | | |
|---|---|---|---|
| MORTGAGE INSURANCE: | LTV | Required Coverage | Loss Exposure |
| | 90.01%–95% | 25% | 72% |
| | 85.01%–90% | 20% | 72% |
| | 80.01%–85% | 17% | 71% |
| 3/2 Option | 95% | 30% | 67% |

| | | | | |
|---|---|---|---|---|
| SELLER CONTRIBUTION: | Occupancy Type | LTV | CLTV | Maximum Contribution |
| | Primary Residence | up to 95% | up to 95% | 3% |
| | Primary Residence | up to 90% | up to 90% | 6% |

| | |
|---|---|
| QUALIFYING RATIOS: | Housing Ratio = 33% |
| | Total Obligation Ratio = 38% |
| | On a case-by-case basis, the above Total Obligation Ratio may be exceeded. Compensating factors which may permit a waiver include excellent credit, strong collateral and job stability. |
| DOWNPAYMENT: | Based on the lesser of the purchase price or the appraised value: |
| | 1-Family: |
| | A minimum down payment of 5% of the borrower's own funds is required, unless the 3/2 Option is used. |
| | 3/2 Option: |
| | A minimum down of 3% from the borrower's own funds is required. The additional 2% may be obtained from another source(s). |
| | 2-Family: |
| | A minimum down payment of 10% of the borrower's own funds is required. |
| RESERVES: | 1-Family: |
| | No cash reserves are required |
| | 2-Family: |
| | Two months principal, interest, taxes and insurance reserves required |
| INCOME ELIGIBILITY: | Where the borrower makes a down payment of 5% or more from his/her own funds, the combined household income is limited to: |

TABLE 1-continued

| | FNMA Community Home Buyer's Program | |
|---|---|---|
| | Boston: | 120% of the area median income |
| | California: | 120% of the area median income |
| | 5 Boroughs of New York: | 165% of the area median income |
| | All other locations: | 115% of the area median income |
| | Where the borrower uses the 3/2 Option, the combined household income is limited to: | |
| | Boston | 120% of the area median income |
| | California: | 120% of the area median income |
| | 5 Boroughs of New York: | 165% of the area median income |
| | All other locations: | 100% of the area median income |
| INCOME REQUIREMENTS | Income includes stable income from all household members from all sources even if the income is not used to qualify. | |
| | Income for the two full years preceding the mortgage application date must be verified to determine its adequacy and likelihood of continuance. | |
| RENTAL INCOME: | A maximum of 70% of the rental income on a 2-Family property may be used to qualify the borrower. | |
| ADDITIONAL INFORMATION SOURCE | Additional information may be obtained by consulting FannieMae Selling and Servicing Guides and the FannieMae Community Home Buyer's Program (FannieMae publication: Enhanced FannieNeighbors with the Community Home Buyer's Program) by contacting the FannieMae Regional Office or by calling FannieMae Headquarters at (202) 752-7000. | |

An example of parameters that may be used to qualify a loan for the FannieNeighbors Mortgage Program is shown in Table 2. It is understood that these criteria may evolve with changing market and regulatory conditions. It is further understood that individual loans may deviate from these standards based on underwriter judgment.

TABLE 2

| | FannieNeighbors Mortgage Program Parameters |
|---|---|
| PROGRAM DESCRIPTION: | This is an agency program designed to meet the needs of low- and moderate-income borrowers in targeted communities by providing flexibility to standard underwriting guidelines while being consistent with safe and sound lending practices. |
| GEOGRAPHICS: | Available in the following locations: |
| | Central Cities as defined by FNMA. |
| | Areas in which the median family income is 80% or less of the income in the Metropolitan Statistical Area (MSA) in which the census tract is located. |
| | Areas in which the minority population is 50% or more. |
| | Areas designated by governmental housing finance agencies as targeted for neighborhood revitalization. |
| | Areas of chronic economic distress as defined by the U.S. Department of Housing and Urban Development (HUD). |
| | Census track information that identifies LMI areas is available on the FannieMaps systems available from a FannieMae regional representative. |
| SOURCING: | Channels |
| | Branch/Realtor |
| | Broker |
| | Community Development Corporations |
| | Corporate |
| | Nonprofit Organizations |
| | Telesales |
| OCCUPANCY: | Primary residence |
| | The borrower(s) may not own any property as of the mortgage application date except for the subject property being refinanced. |
| LOAN PURPOSE: | Purchase |
| | Rate and Term Refinance |
| PROPERTY TYPES: | 1-Family |
| | Condominiums |
| | PUDs |
| | Townhouses |
| | Cooperatives (Coops) |
| | 2-Family |
| AVAILABLE PRODUCTS: | 15 Year Conforming Fixed Rate |
| | 30 Year Conforming Fixed Rate |
| AMORTIZATION TERM: | 15, 20 and 30 year terms |

TABLE 2-continued

FannieNeighbors Mortgage Program Parameters

| | | | | | |
|---|---|---|---|---|---|
| LOAN AMOUNTS: | Number of Units | Minimum | Maximum | | |
| | 1 Unit | none | $203,150 | | |
| | 2 Units | none | $259,850 | | |
| LOAN-TO-VALUE: | | PURCHASE | | RATE AND TERM REFINANCE | |
| | Property | LTV  CLTV | LTV  CLTV | | |
| | 1-Family | 95%  95%* | 90%  90% | | |
| | 2-Family | 90%  90% | 90%  90% | | |
| | *97% permitted on 3/2 option where the 2% is obtained as secured financing. | | | | |
| MORTGAGE INSURANCE: | LTV | Required Coverage | Exposure | | |
| | 90.01%–95% | 25% | 72% | | |
| | 85.01%–90% | 20% | 72% | | |
| | 80.01%–85% | 17% | 71% | | |
| 3/2 Option | 95% | 30% | 67% | | |
| SELLER CONTRIBUTION: | Occupancy Type | LTV | CLTV | Maximum Contribution | |
| | Primary Residence | up to 95% | up to 95% | 3% | |
| | Primary Residence | up to 90% | up to 90% | 6% | |
| QUALIFYING RATIOS: | Housing Ratio = 33% Total Obligation Ratio = 38% On a case-by-case basis, the above Total Obligation Ratio may be exceeded. Compensating factors which may permit a waiver include excellent credit, strong collateral and job stability. | | | | |
| DOWNPAYMENT: | Based on the lesser of the purchase price or the appraised value: 1-Family: A minimum down payment of 5% of the borrower's own funds is required, unless the 3/2 Option is used. 3/2 Option: A minimum down of 3% from the borrower's own funds is required. The additional 2% may be obtained from another source(s). 2-Family: A minimum down payment of 10% of the borrower's own funds is required. | | | | |
| RESERVES: | 1-Family: No cash reserves are required 2-Family: Two months principal, interest, taxes and insurance reserves required | | | | |
| INCOME ELIGIBILITY: | There shall be no limitation on the borrower's combined household income where the borrower makes a minimum down payment of 5% from his/her own funds. Where the borrower uses the 3/2 Option, the combined household income is limited: | | | | |
| | Boston: | 120% of the area median income | | | |
| | California: | 120% of the area median income | | | |
| | 5 Boroughs of New York: | 165% of the area median income | | | |
| | All other locations: | 115% of the area median income | | | |
| INCOME REQUIREMENTS: | Income includes stable income from all household members from all sources even if the income is not used to qualify. Income for the two full years preceding the mortgage application date must be verified to determine its adequacy and likelihood of continuance. | | | | |
| RENTAL INCOME | A maximum of 70% of the rental income on a 2-Family property may be used to qualify the borrower. | | | | |
| ADDITIONAL INFORMATION SOURCE: | Additional information may be obtained by consulting FannieMae Selling and Servicing Guides, FannieMae Announcement 94-17, and FannieMae FannieNeighbors information booklet available by contacting the FannieMae Regional Office or by calling FannieMae Headquarters at (202) 752-7000. | | | | |

An example of parameters that may be used to qualify a loan for the FHLMC Affordable Gold Program is shown in Table 3. It is understood that these criteria may evolve with changing market and regulatory conditions. It is further understood that individual loans may deviate from these standards based on underwriter judgment.

TABLE 3

| FHLMC Affordable Gold Program | |
|---|---|
| PROGRAM DESCRIPTION: | This is an agency program designed to meet the needs of low- and moderate-income borrowers by providing various flexibility to standard underwriting guidelines while being consistent with safe and sound lending practices. |
| GEOGRAPHICS: | All states |
| SOURCING | Channels |
| | Branch/Realtor |
| | Broker |
| | Community Development Corporations |
| | Corporate |
| | Nonprofit Organizations |
| PROPERTY TYPES: | 1-Family |
| | Condominiums |
| | Planned Unit Developments |
| | Townhouses |
| LOAN PURPOSE: | Purchase |
| | Rate and Term Refinance |
| OCCUPANCY: | Primary residence |
| | The borrower(s) may not own any property as of the mortgage application date except for the subject property being refinanced. |
| AVAILABLE PRODUCTS: | 30 Year Conforming Fixed Rate |
| AMORTIZATION TERM: | 30 year term |
| LOAN AMOUNTS: | Number of Units   Minimum   Maximum |
| | 1 Unit             none      $203,150 |
| LOAN-TO-VALUE: | |

|  | PURCHASE | | RATE AND TERM REFINANCE | |
|---|---|---|---|---|
| Property | LTV | CLTV | LTV | CLTV |
| 1-Family | 95% | n/a | 90% | n/a |

| MORTGAGE INSURANCE: | LTV | Required Coverage | Loss Exposure |
|---|---|---|---|
| | 90.01%–95% | 25% | 72% |
| | 85.01%–90% | 20% | 72% |
| | 80.01%–85% | 17% | 71% |
| 3/2 Option | 95% | 30% | 67% |

| SELLER CONTRIBUTION: | Occupancy Type | LTV | CLTV | Maximum Contribution |
|---|---|---|---|---|
| | Primary Residence | up to 95% | up to 95% | 3% |
| | Primary Residence | up to 90% | up to 90% | 6% |

| QUALIFYING RATIOS: | Housing Ratio = 33% |
|---|---|
| | Total obligation Ratio = 38% |
| | The above ratios may be justified with compensating factors. |
| DOWN PAYMENT: | A minimum down payment of 5% of the lesser of the purchase price or the appraised value is required, from the borrower's own funds, unless the 3/2 Option is used. |
| | 3/2 Option: |
| | A minimum down of 3% from the borrower's own funds is required. |
| | The additional 2% may be obtained from another source(s). |
| RESERVES: | The required two months reserve will be waived if: |
| | A satisfactory appraisal is received evidencing the property to be in very good condition and |
| | A satisfactory property inspection report is submitted. |
| INCOME ELIGIBILITY: | The combined household income is limited to 115% of the area median income, except in the following high cost areas: |
| | Boston:  120% of the area median income |
| | California:  120% of the area median income |
| | 5 Boroughs of New York:  120% of the area median income |
| INCOME REQUIREMENTS | Income includes stable income from all household members from all sources even if the income is not used to qualify. |
| | Income for the two full years preceding the mortgage application date must be verified to determine its adequacy and likelihood of continuance. |
| ADDITIONAL INFORMATION SOURCE | Additional information may be obtained by contacting the FreddieMac corporate headquarters at 8200 Jones Branch Dr. McLean, VA 22102 ph. (703) 903-2000. |

In addition to the 1-4 family residential mortgage programs outlined in Tables 1, 2 and 3, the network may purchase assets in other categories.

Multifamily Mortgages

The CRA network may purchase any loan for low income and affordable housing, elderly housing, property modernization or rehabilitation for inclusion in the multifamily mortgage portfolio. The property to which the loan relates may be located within an LMI zip code as defined below, an LMI census tract, or within zip code/census tract exceptions in accordance with CRA regulations.

Home Equity Loans

The CRA network may purchase any home equity loan originated for home improvement, small business investment or for education funding for inclusion in the home equity loan portfolio. The property to which the loan relates may be located within an LMI zip code as defined below, an LMI census tract, or within approved zip code/census tract exceptions in accordance with CRA regulations.

Small Business Loans

The CRA network may purchase any small business loan originated under any federal, state or local small business development program for inclusion in the small business loan portfolio. This may include any loan made or insured by any government sponsored agency or sanctioned small business loan secondary market intermediary or insurer. The small business to which the loan relates may be located within an LMI zip code as defined below, an LMI census tract, or within approved zip code/census tract exceptions in accordance with CRA regulations.

Student Loans

The CRA network may purchase student loans based on the borrower's location. For inclusion in the student loan portfolio, the CRA network may purchase student loans where the borrower's location may be within an LMI zip code as defined below, an LMI census tract, or within approved zip code/census tract exceptions in accordance with CRA regulations.

Geographic Criteria

In the current regulations, LMI areas are defined primarily by income and census tracts. However, each regulated institution is given some latitude in defining its service area with respect to its main office and branches. In the network, LMI geographies will be defined in a manner consistent with the rules set forth in the CRA regulations and will be amended consistent with amendments to the CRA regulations.

For example, LMI geographies may be defined consistent with FNMA guidelines. These may include any dominant zip code listed on FNMA's "FannieMaps Low/Moderate and Minority Census Tracts" and any "central city" as defined by the Office of Management and Budget (OMB). The boundaries of a central city may be its entire corporate limits which may include non-LMI geographies. Income standards and/or relatively low loan sizes in combination with relatively high loan-to-value ratios assure LMI borrowers are targeted in all areas. From time to time, exceptions to FNMA guidelines may be made. These may include, for example, areas targeted for revitalization or high cost areas as defined by the U.S. Department of Housing and Urban Development (HUD), and other special exceptions. FNMA and the FHLMC make similar exceptions and have programs that may create CRA eligible assets. These special exceptions are usually targeted at areas under economic distress such as, the 1992 Los Angeles riot area, areas effected by military base closings and/or areas damaged in natural disasters. The network may create and maintain a list of eligible LMI geographies for use in determining a loan's CRA qualification.

Allocation of CRA Interests

The CRA allocation process may identify, locate and acquire qualifying loans in an investor's delineated geographical service area. CRA interests for home loans and small business loans may be allocated by the location of the underlying property or small business. Student loan CRA interest may be allocated by the address of the borrower.

Investors requesting CRA interests may receive allocations via the network's CRA accounting process. The first CRA interests may be assigned to retail institutions with CRA needs in specific delineated communities or may be allocated to meet the local requirements of wholesale and limited purpose entities. Interests that do not meet either of the above criteria may be allocated to wholesale and limited purpose institutions (over and above their local requirements) to fulfill regional or national service area requirements. Assets remaining in the network may have no specific CRA allocation. For example, a sample portfolio is depicted in Table 4. The portfolio holds assets one through nine. As shown in the value column, the value of each asset may be different. The location column signifies the asset's geographic location and/or CRA delineation.

TABLE 4

SAMPLE PORTFOLIO ASSETS

| Assets | Value | Location |
| --- | --- | --- |
| asset 1 | 5 | A |
| asset 2 | 10 | A |
| asset 3 | 15 | A |
| asset 4 | 20 | B |
| asset 5 | 30 | B |
| asset 6 | 35 | C |
| asset 7 | 40 | C |
| asset 8 | 45 | D |
| asset 9 | 50 | D |
| total | 250 | |

All investors hold undivided interests in the fund and participate in its gains, losses and returns on a per share basis. Table 5 depicts sample investors one through five. The initial investment column shows each individual investor's investment in the sample portfolio. The financial accounting column shows the percentage of the portfolio owned by each investor. Note that this calculation is simply the value of the investor's investment divided by the total value of the portfolio. The column labeled Desired CRA Allocations shows the geographic location of CRA assets requested by each investor at the time of initial investment.

TABLE 5

FINANCIAL ACCOUNTING

| Investor | Initial Investment | Financial Accounting: % of Shares Owned | Desired CRA Allocations |
|---|---|---|---|
| investor 1 | 110 | 110/250 = 44% | >=25% in location A, balance national |
| investor 2 | 55 | 55/250 = 22% | >= 25% in location B, balance national |
| invertor 3 | 40 | 40/250 = 16% | location C only |
| investor 4 | 15 | 15/250 = 6% | location D only |
| investor 5 | 30 | 30/250 = 12% | none |
| total | 250 | 100% | |

Investors requesting CRA allocations are allocated specific interests associated with specific assets. The CRA accounting system is for CRA compliance reporting and informational purposes and may not effect the economic return of the portfolio. Table 6 depicts how the assets in the sample portfolio may be distributed to satisfy the investor demands outlined in Table 5. Table 7 depicts how the CRA interest from each particular asset may be distributed.

ensure that interest for a single asset is never allocated to more than one investor. The sum total of CRA allocations may not exceed the assets of the network but may be less than 100% if the network attracts investors who do not require CRA eligible interests. In addition, investors may not receive CRA allocations for more than 100% of their investment. The network may provide investors with statements of their CRA allocations and the allocations may be reviewed by the network's external auditors. It will be appreciated by those in the financial arts that the present invention may distribute the risk of a pool of assets while separately allocating a cognizable interest in a specific asset to a particular investor.

Risk Management

Holding individual assets, especially mortgage assets, is typically a risky proposition for investors due to the principal and income volatility associated with changing interest rates and other market factors. The network may diversify the portfolios to reduce market risks. The network may acquire either fixed or floating rate assets and may manage interest rate risk within each portfolio by converting assets to floating rates to the greatest extent possible. The management of interest rate risk may be provided as an ancillary

TABLE 6

CRA INTEREST ALLOCATION BY INVESTOR

| Investor | | Local Requirements | | National Requirements | | Unallocated | | Total |
|---|---|---|---|---|---|---|---|---|
| investor 1 | asset 1(A) | 5 | asset 6(C) | 35 | | | | |
| | asset 2(A) | 10 | asset 8(D) | 45 | | | | |
| | asset 3(A) | 15 | | | | | | |
| | | 30 | | 80 | | | | 110 |
| investor 2 | asset 4(B) | 20 | 10% of asset 9(D) | 5 | | | | |
| | asset 4(B) | 30 | | | | | | |
| | | 50 | | 5 | | | | 55 |
| investor 3 | asset 7(C) | 40 | none | | | | | 0 |
| investor 4 | 30% of asset 9(D) | 15 | none | | | | | 15 |
| investor 5 | none | | none | | 60% of asset 9(D) | 30 | | 30 |
| total | | 135 | | 85 | | 30 | | 250 |

TABLE 7

CRA INTEREST ALLOCATION BY ASSET

| Asset | | Local Requirements | National Requirements | | Unallocated | | Total |
|---|---|---|---|---|---|---|---|
| asset 1(A) | investor 1 | 5 | | | | | 5 |
| asset 2(A) | investor 1 | 10 | | | | | 10 |
| asset 3(A) | investor 1 | 15 | | | | | 15 |
| asset 4(B) | investor 2 | 20 | | | | | 20 |
| asset 5(B) | investor 2 | 30 | | | | | 30 |
| asset 6(C) | | | investor 1 | 35 | | | 35 |
| asset 7(C) | investor 3 | 40 | | | | | 40 |
| asset 8(D) | | | investor 1 | 45 | | | 45 |
| asset 9(D) | 30% to investor 4 | 15 | 10% to investor 2 | 5 | unallocated | 30 | 50 |
| total | | 135 | | 85 | | 30 | 250 |

The allocation of CRA interests may change over time as investors come into and out of the network. Sufficient data may exist within the CRA accounting process for examiners to link a regulated institution's investment to loans in its community. Standard banking control procedures and accounting mechanisms for computerized networks may service for investors. If interest rate risk management services are provided, the network will perform the required accounting processes to properly track the risk management.

Computerized Implementation and Operation

It is understood to those in the transaction processing and computer finance art that the client service administrator 10, transfer agent 16, investment advisor 26, financial accountant 18, CRA accountant 20, and custodian 24 may be implemented as processes within a single high speed computer processor or with any number of separate processors to form a multiprocessor network. It is understood that the different processes may benefit from varying degrees of operator intervention and/or oversight. In the single processor implementation the system may communicate between the processes with inter-process messaging such as STREAMS, virtual device drivers, and asynchronously through the data storage device 12. In the multiprocessor configuration, the communication lines may be local, such as with an ethernet or token ring connection, and/or remote through a custom or standard wide area network protocol stack, such as the open system interconnect (OSI) model, asynchronous transfer mode (ATM), transmission control protocol/internet protocol (TCP/IP), and/or other hybrid networks such as high speed protocol routers available from vendors such as Wellfleet or Cisco.

The network's data storage device 12 may be implemented with one or more commercially available storage devices such as a magnetic tape drive, magnetic disk drive, a read/write optical drive, or even a large bank of random access memory (RAM) or FLASH™ memory.

As evident from the multiple processes in the CRA network, the present invention may be implemented on a multitasking operating system such as OS/2™, UNIX™, VMS™, or SOLARIS™. UNIX™ and SOLARIS™ are readily available from Sun Microsystems, Inc. and many other UNIX™ vendors. Implementation on a single task operating system, however, such as Microsoft DOS or WINDOWS™ is within the scope of the present invention.

It is understood that fourth generation language (4GL) relational database technology may be used to implement the present invention. Moreover, those skilled in the computer financial arts will appreciate that system security, audit trails, and access control are of paramount importance when implementing a financial computer system. These security features are well known to those in the computer financial arts and can be implemented with conventional and 4GL technology.

System Overview

FIG. 1 shows the overall structure of a CRA network. The Client Service Administrator (CSA) 10 may function as the user interface for the network. This may include entering investor information, changing CRA qualifying parameters, informing investors of transactions, reporting account status, and the like and printing "hard copy" transaction reports. The records symbol 12 represents a data storage device. It is understood that the records device 12 may be a 4GL database that may implement the stringent security and fault redundancy requirements of a financial computer system. The secondary markets 14 represent the electronic data interchange, and/or communications links to large and small financial networks and loan transfer networks. The secondary markets 14 may be a data feed showing the availability and price of loans and securities on the market. This data may be displayed on a control terminal and/or electronically fed to the investment advisor 26. The transfer agent 16 may be a control process that executes transactions with other networks and may also execute internal transactions. The transfer agent 16 may maintain records of share transactions and communicate with the investment advisor 26 to determine whether to buy or sell portfolio assets 30. The financial accountant 18 may establish a portfolio share price and a rate of return. The financial accountant 18 may also communicate portfolio risk and return information to the investment advisor 26 so the investment advisor 26 may determine network investment decisions to maintain a stable and safe return on the network portfolios 28. It is understood that the investment advisor 26 may hedge the portfolios to stabilize their return. The financial accountant 18 may also communicate with the transfer agent 16 to receive the buy and sell dates of the assets 30 and to receive transaction cost information. It is understood that network transaction costs may be used by the financial accountant 18 to offset the network portfolio returns. The CRA accountant 20 may be a CRA interest accounting system in parallel with the financial accountant 18. The CRA accountant 20 process may conduct transactions with CRA interests, record CRA allocation transactions, and determine CRA loan eligibility. The CRA accountant 20 may maintain a 4GL database to record CRA interest transactions on the record device 12. This information may be used by the CRA accountant 20 to track all CRA interests. The custodian 24 may be a computer process that provides safekeeping and acknowledges receipt of loans or securities and other assets owned by the network. The investment advisor 26 may be a computer process that produces investment advice for the network. It is understood that the investment advisor 26 may consider the network's need for local, regional or national CRA interest and the network's need to provide a stable and safe return on the portfolios 28 when formulating its advice. The investment advisor 26 may be a data feed showing the availability, price and attributes of loans and securities on the market. This data may be displayed on a control terminal where a qualified operator may approve and/or disapprove network acquisitions. The portfolios 28 may be CRA eligible assets in the following categories: 1–4 family mortgages 32, multifamily mortgages 34, home equity loans 36, small business loans 38, and student loans 40. The assets 30 may be the CRA eligible loans, and/or assets that underlie the portfolios. The participants 42 are investors that communicate with the network through the client service administrator 10. The communications link between the participants 42 and the client service administrator 10 may be telephone, mail, digital data transfer, facsimile, other communication links, and/or a local connection. Control processes may ensure that information is simultaneously updated in every part of the network and final balances for every aspect of the network may be proofed against each other to ensure consistency of information transferred and to monitor ongoing system performance. In summary, the CRA network may have two fundamental components, the financial accountant 18 and the CRA accountant 20. The CRA network may use the financial accountant 18 to calculate and distribute the return on an investment in the network to the investors. The CRA network may use the CRA accountant 20 to calculate the CRA interest available from the network's assets 30 and distribute the CRA interest to the investors. Each pool of assets 28 may be structured as an investment company (whether registered under the Investment Company Act of 1940 or exempt therefrom), a trust, a limited liability corporation, a limited partnership, a general partnership, a limited liability partnership, a mutual fund, a REMIC, an unincorporated association or any other suitable legal financial structure. It is understood that the network may comply with the registration and regulations of the Investment Company Act of 1940, the Investment Advisors Act of 1940, and other appropriate requirements necessary to formulate an appropriate financial structure. The computer implementation of the CRA network may be best understood by a detailed discussion of the client service administrator 10, transfer agent 16, financial accountant 18, CRA accountant 20, custodian 24, and investment advisor 26.

The Client Service Administrator

FIG. 2 shows a diagram of data fields that may be used as a CRA transaction record. A participant 42 may notify the network that they wish to participate in one or more portfolios of the CRA network. In response, the client service administrator (CSA) 10 may issue a request for investor information to a workstation console or data terminal. The information requested for network participation may include the: investor name 50; investor address 52; local CRA requirements 54; regional or national CRA requirements 56; desired portfolio(s) 58, e.g., 1–4 family mortgages 60, multifamily mortgages 62, small business loans 64, home equity loans 66, student loans 68; investment amount 72; purchase date 74; and a sell date 76.

The CSA 10 may verify that the necessary investor information is complete. If the information is not complete the CSA 10 may notify the console and reject the application. Once the CSA 10 verifies that the necessary investor data is present the CSA 10 may store the request on a standby purchase order record on the record device 12 and alert the CRA accountant 20 to the new transaction.

The CSA 10 may use the information from the transaction record to create a 4GL database data record on the record device 12. A field in the 4GL record may be designated to indicate the status of the transaction. For example, if a participant 42 requests local CRA interest that is not presently owned by the network then the designated field in the 4GL record may be used to indicate that this transaction is a temporarily unfulfilled CRA interest request. Such a 4GL data record may be used in place of the standby purchase order record.

It is understood that the CRA interest 54 request may be in a format that denotes a regulated financial institution's delineated geographic operating area. This format may use zip code, census tract or any other geographic coordinate format consistent with CRA regulations. It is within the scope of the present invention, however, that the network may calculate the regulated financial institution's delineated geographic area. Such calculations may be accomplished with FannieMaps type methods known to the financial arts.

Other functions carried out by the CSA 10 may include processing requests from the network to generate hard copy print outs to meet informational requests.

The Transfer Agent

The transfer agent 16 may be a conventional transactional processing element used to establish and maintain a portfolio of assets. Transfer agent functions may include buying and selling assets and other portfolio maintenance functions. The transfer agent 16 may provide a conventional means for transferring funds into and out of the network. The transfer agent 16 may also maintain records of share transactions and communicate with the investment advisor 26 to receive direction on whether to buy or sell portfolio assets 30. The transfer agent 16 may execute several asynchronous processes. One process the transfer agent 16 may conduct is the steps necessary to process the conventional aspects of a network transaction. For example, the standby purchase order generated by the CSA 10 may be a record of a participant's request to purchase shares in a portfolio and obtain local CRA interest. This particular request may require several steps to execute such as, the participant may convey funds to the network to purchase portfolio shares, the network may debit the participant's cash account and credit the participant's portfolio share account, the network may allocate portfolio shares to the participant and record the transaction, and the network may match a participant's (now a shareholder's) local CRA interest request with asset(s) that are eligible for the CRA and in the proper geographic location. The transfer agent 16 may execute the steps concerning the transfer of participant funds, the transfer of portfolio shares and the recordation of this transfer on the records device 12. The CRA accountant 20, discussed in detail below, may execute the steps concerning the allocation of CRA interest and the recordation of the CRA interest transfer on the records device 12. The transfer agent 16 may transfer portfolio shares to a participant's share account when the participant's cash account has a balance sufficient to cover the transfer and/or the transfer agent 16 may conduct the transfer on the requested purchase date 74. Thus, the CRA network may use the purchase date field 74 to receive share purchase orders in advance of the execution date. This may assist the network in identifying CRA qualifying assets in a particular region before the network procures the asset. When the transfer agent 16 executes a transfer using a standby purchase order, the transfer agent may copy information from the standby purchase order to a new transaction record (NTR). It is understood that in a 4GL implementation, a data field in a data record that indicates the status of a transaction may be changed by the transfer agent 16 when the transfer agent 16 executes a transfer.

The transfer agent 16 may also monitor the electronic fund transfer network (EFTN) for incoming transactions. If an electronic fund transfer is detected the transfer agent 16 may read the account and amount data fields and create an electronic fund transfer record on the record storage device 12. The transfer agent 16 may also respond to directives from the investment advisor 26 to buy and sell portfolio assets in the secondary markets.

It is understood that various aspects of the transfer agent 16 may be implemented with operator assistance and is within the scope of the present invention. For example, a control terminal or data communication path may be established between the transfer agent 16 and a data or workstation terminal. The terminal may display transactions the transfer agent is conducting or will conduct subject to operator approval at the terminal. A system with multiple transaction check points and backup procedures, such as that offered by operator intervention at the transfer agent 16, may be used to maintain the high network integrity, performance and security expected from a financial computer system.

The Financial Accountant

The financial accountant 18 may be a computer process that calculates the cost of the portfolio shares, the return of the portfolio(s) and distributes the returns from the portfolio (s) to the portfolio shareholders. The financial accountant 18 may determine portfolio share price by calculating the value of the portfolio security and/or asset holdings, calculating the return and subtracting from the total return the costs necessary to operate and maintain the network and dividing this by the number of outstanding shares. The financial accountant 18 may keep a general ledger and the like on the portfolio(s). The financial accountant 18 may communicate with the transfer agent 16 to create a computer record on the records device 12 of when an investor buys or sells portfolio shares. The financial accountant 18 may also communicate with the investment advisor 26 to indicate the rate of return on the portfolios.

The CRA Accountant

The CRA accountant 20 may be a computer process that conducts all the functions and transactions necessary to calculate and distribute CRA interest to shareholders of a portfolio. These functions may include calculating the amount of CRA interest available from an asset, creating a computer record to link each CRA interest with an asset, maintaining a list of parameters that qualifies an asset for CRA interest, distributing CRA interest to a portfolio shareholder based on the geographic location of the CRA interest and the shareholder's CRA requirements, and creating a computer record to record and track the distribution of CRA interests. The CRA accountant 20 may communicate with the investment advisor 26 to indicate geographic areas in which the network needs assets to satisfy shareholder CRA requirements. The CRA accountant 20 may also communicate with the CSA 10 to receive notice of new network transactions and CRA requirements.

It is understood that various aspects of the CRA accountant 20 may be implemented with operator assistance and is within the scope of the present invention. For example, a control terminal or data communication path may be established between the CRA accountant 20 and a data or workstation terminal. The terminal may display the parameters used by the CRA accountant 20 to qualify an asset for CRA interest, the terminal may display the CRA interest allocation between a particular asset and a particular shareholder and/or the terminal may display other like CRA information. The operator may change the parameters and approve transactions as required to maintain the high network integrity, performance and security expected from a financial computer system.

The Custodian

The custodian 24 may be a computer process that provides safekeeping for the assets and acknowledges receipt and transfer of assets owned by the network. The custodian 24 may receive messages from the transfer agent 16 to await receipt of assets and fund transfers. The custodian 24 may send messages to the transfer agent 16 when assets are received and send a message to the transfer agent 16 that such a loan is available for purchase by the network. It is understood that the network can function with multiple custodians and that various degrees of operator participation in the custodian 24 process is within the scope of the present invention.

The Investment Advisor

The investment advisor 26 may be a computer process that determines what securities and individual loans the network should buy, hold, and sell. This determination may balance the network's goal of providing specific CRA interest to a particular shareholder and providing a safe and stable return on the portfolio(s). The investment advisor 26 may communicate with the CRA accountant 20 to determine the geographic information and CRA qualifying information necessary to procure an asset that qualifies for the network. The investment advisor 26 may use geographic information, asset risk factors, and portfolio management techniques to generate an asset procurement profile that may be used to buy and sell portfolio assets 30. The investment advisor 26 may communicate with the transfer agent 16 to order the transfer agent 16 to buy or sell assets 30.

If the investor purchases the optional interest rate risk management service, the investment advisor 26 may hedge fixed rate assets by utilizing standard or customized futures or derivatives to convert the fixed rate revenue to floating. The investment advisor 26 may report transaction costs to the financial accountant 18. The financial accountant 18 may include the cost of hedging transactions and other transaction costs as a portfolio maintenance cost.

It is understood that various aspects of the investment advisor 26 may be implemented with qualified operator assistance and is within the scope of the present invention. For example, a control terminal or data communication path may be established between the investment advisor 26 and a data or workstation terminal. The terminal may display investment profiles the investment advisor 26 is using or will use subject to qualified operator approval at the terminal. Moreover, the investment advisor 26 may receive direction from a qualified operator to buy and sell particular assets. It is understood that a qualified operator may comply with the Investment Advisors Act of 1940. An investment advisor 26 system with multiple check points and backup procedures, such as that offered by operator intervention at the investment advisor 26, may be used to maintain the high network integrity, performance and security expected from a financial computer system.

Figure 3:
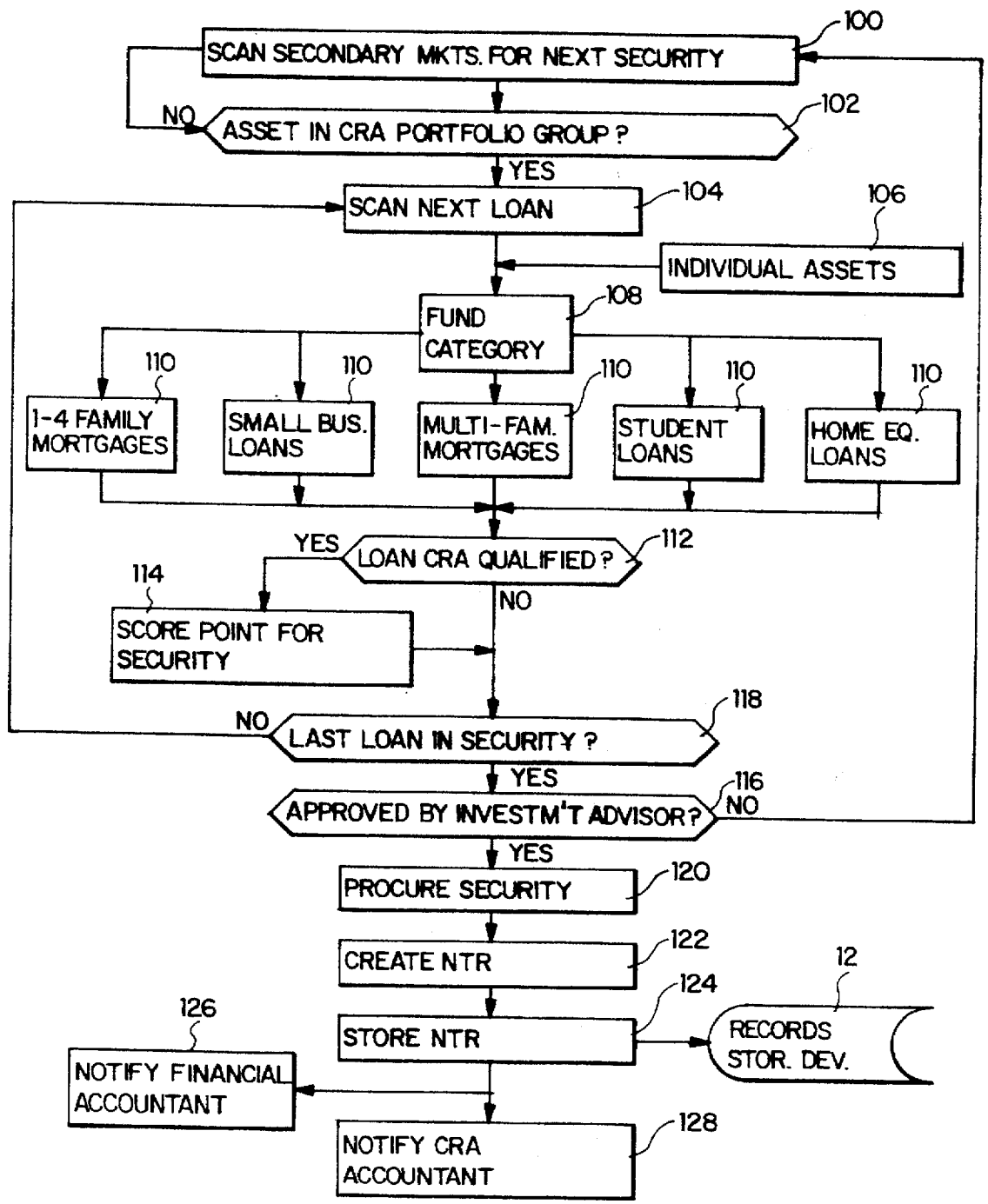
FIG. 3 is a schematic flow diagram showing a method the network may use to acquire assets that are qualified for the CRA transaction network. The method shown may scan a security to determine if the security meets CRA requirements and investor requirements and submit the security for procurement approval to the investment adviser. This method may be used to determine if the network should procure a security from the secondary market. This method may also be used to procure individual assets.

FIG. 3 is a schematic diagram of the steps the network may use to determine whether to purchase a bundled security or a particular asset for the network. Depending on the state of the network and whether the network needs to purchase a bundled security, the network may search for a security in the following steps: scan the secondary market for a bundled security 100, determine if the security is in a CRA portfolio group 102; if a security is in a CRA portfolio group 102, then assets in the security will be individually checked for whether each asset qualifies for CRA interest 104, 108, 110, 112. Each asset in the security that qualifies for CRA interest may score a point for the security 114. Each asset in the security is evaluated separately until all assets in the security have been reviewed 118. It is understood that an asset may qualify for the CRA based on loan factors and the loan's geographic origin. This general CRA qualification may be performed for each loan category at the CRA qualification subroutines 110. The points scored by a security may be used by the investment advisor 26, along with other factors, to compare securities and determine whether the network should buy the security from the secondary market 116. Meeting all criteria is a necessary but not a sufficient condition for the network to acquire an asset. Among the other factors the investment advisor 26 may use to determine whether an asset should be purchased by the network is the specific CRA requirements of the investors. Thus, a security or particular asset may qualify for the CRA but the specific location of the asset may not satisfy the requirements of the investors. The investment advisor 26 may use the general CRA qualification factors, portfolio risk factors, and the specific requirements of the investors to determine whether to purchase a security or particular asset for the network 116. If the network buys the security 120 the transfer agent 16 may record the transaction 124 on the record storage device 12 by creating a new transaction record 122. It is understood that a 4GL implementation may use a data field in a database record to indicate the new transaction 120. The transfer agent 16 may notify the financial accountant 126 and the CRA accountant 128 about the new security 120. The financial accountant 18 may adjust the portfolio balance to accommodate the new security. Likewise, the CRA accountant 20 may calculate and distribute CRA interest derived from the security's assets.

The CRA network may purchase and hold individual assets if the asset qualifies for CRA interest. Preferably, the asset will satisfy a shareholder's CRA interest requirement, and is approved by the investment advisor 26 as a sound portfolio investment. Procurement of individual assets may be initiated at step 106. The network may procure the individual asset with the following steps: determine the fund category of the asset 108, determine whether the asset is qualified for CRA interest 110 and 112, determine whether the asset is approved by the investment advisor 26 at step 116 and procure the asset at step 120. If the asset is procured by the network and booked on the system the transfer agent 16 may create a record of the transaction 124 on the record storage device 12 and notify the financial accountant 126 and the CRA accountant 128. The transfer agent 16 may create a new transaction record 122 to record the transaction, however, it is understood that a 4GL data record may also be used to record the transaction.

Figure 4:
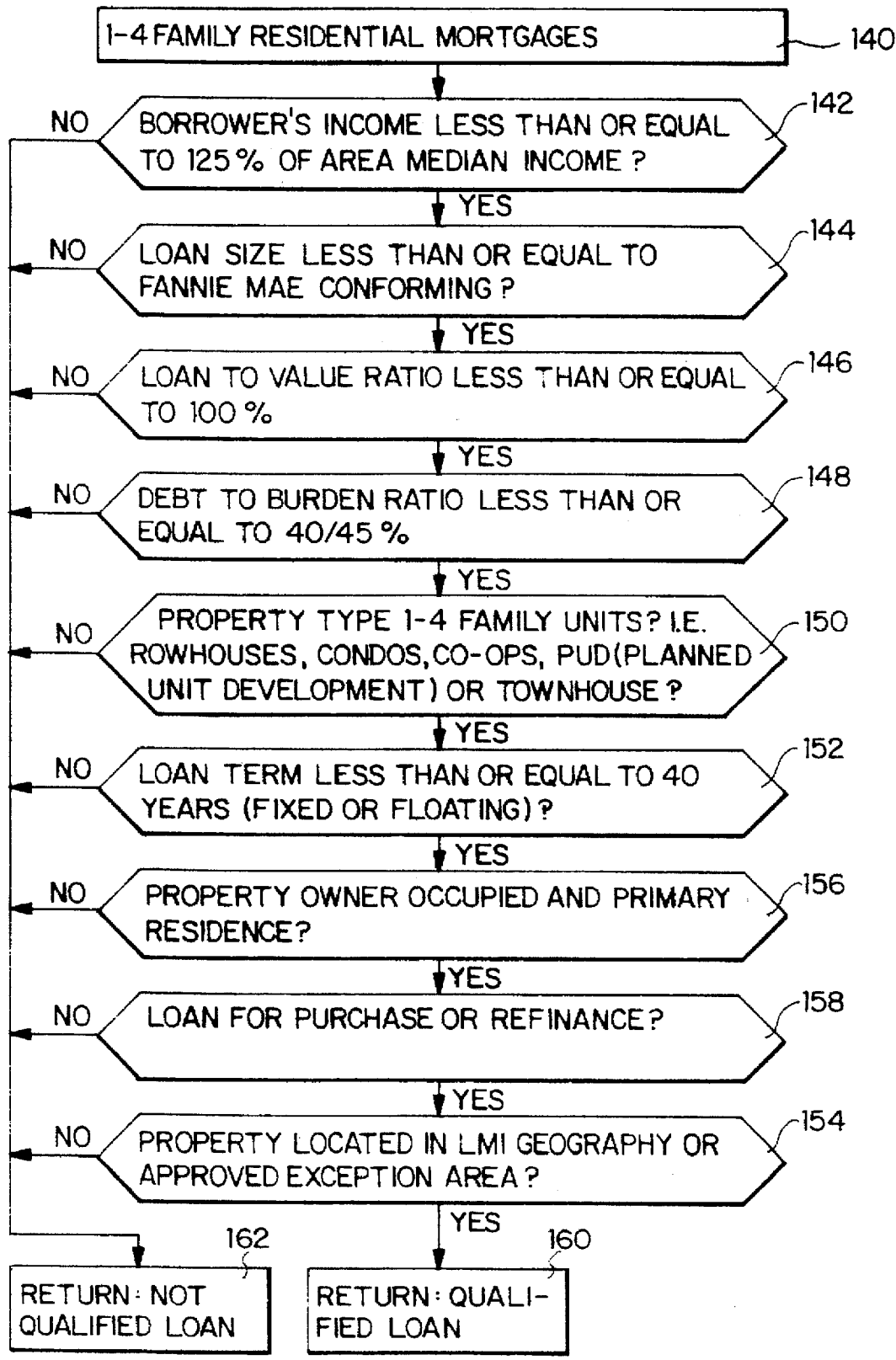
FIG. 4 is a schematic flow diagram showing a method the network may use to determine whether a 1-4 family residential mortgage is qualified for the network. The schematic flow diagram shown in FIG. 4 may be a subroutine that may be called from the flow diagram shown in FIG. 3.

FIG. 4 is a schematic diagram of the steps the network may use to determine whether a 1–4 family mortgage asset is qualified for CRA interest. This schematic may be used as a sub-routine for the evaluation steps shown in FIG. 3. It is understood that the parameters listed in tables 1–3 may also be used as CRA qualifying criteria. Moreover, it is within the scope of the present invention that other criteria may be used to determine whether an asset is qualified for CRA interest. It will be appreciated by those in the regulated financial industry that CRA qualifying criteria is subject to regulatory change and approval. It is understood that the CRA network's design and 4GL database implementation is such that the present invention anticipates these changes and can readily adapt to meet changing CRA criteria and accommodate special CRA programs. Accordingly, the network may use a CRA qualifying sequence as follows. If the borrower's income is less than or equal to 125% of the area median income 142, and if the loan size is less than or equal to FannieMae conforming 144, and if the loan to value ratio of the property is less than or equal to 100% 146, and if the debt to burden ratio of the borrower is less than or equal to 40 to 45% 148, and if the property type is a 1–4 family townhouse, rowhouse, condominium, cooperative, or planned unit development 150, and if the loan term is less than or equal to 40 years 152, and if the property owner does occupy the property and it is their primary residence 156, and if the loan was used to purchase or refinance the property 158, and if the property is located in a LMI geography or approved exception area 154, then the loan may be CRA qualified 160. If the loan fails any of the above steps then the loan may be deemed not qualified 162. In the second embodiment of the present invention, the CRA eligibility criteria shown in Tables 1–3 may be used in place of or as a supplement to the steps shown in FIG. 4. It is understood to those in the transaction processing and computer financial arts that such approval processes also can be implemented by 4GL database computer programming techniques.

Figure 5:
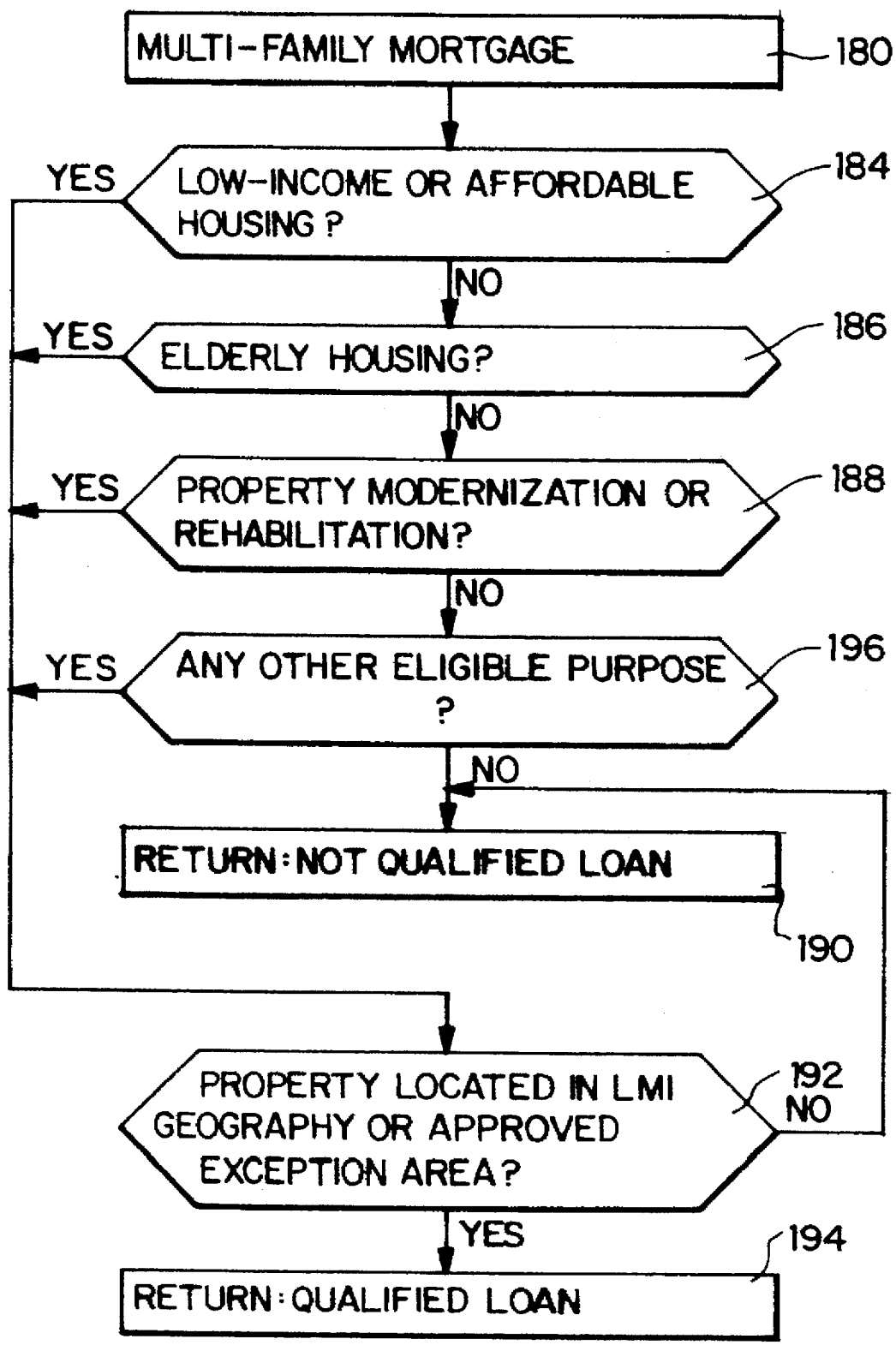
FIG. 5, is a schematic flow diagram showing a method the network may use to determine whether a multi-family mortgage is qualified for the network. The schematic flow diagram shown in FIG. 5 may be a subroutine that may be called from the flow diagram shown in FIG. 3.

Turning now to FIG. 5, if appropriate, the network may use the disclosed multifamily mortgage fund CRA approval procedure to determine whether an asset is qualified for the CRA. As stated above, it is understood that CRA criteria may change from time to time and that such changes and special programs are within the scope of the present invention. The network may determine if the asset is a CRA qualified multifamily mortgage as follows: If the loan is for low income or affordable housing 184, and the property is located in a LMI geography or approved exception area 192, then the loan may be CRA qualified 194. If the mortgage is for elderly housing 186, and the property is located in a LMI geography or approved exception area 192, then the loan may be CRA qualified 194. If the mortgage is for property modernization or rehabilitation 188, and the property is located in a LMI geography or approved exception area 192, then the loan may be CRA qualified 194. If the property is for any other eligible purpose 196, and the property is located in a LMI geography or approved exception area 192, then the loan may be CRA qualified 194. If the property is not in a LMI geography or approved exception area 192, then the loan may not be CRA qualified 190. If the property does not pass one of the above criteria then the mortgage may not be CRA qualified 190.

Figure 6:
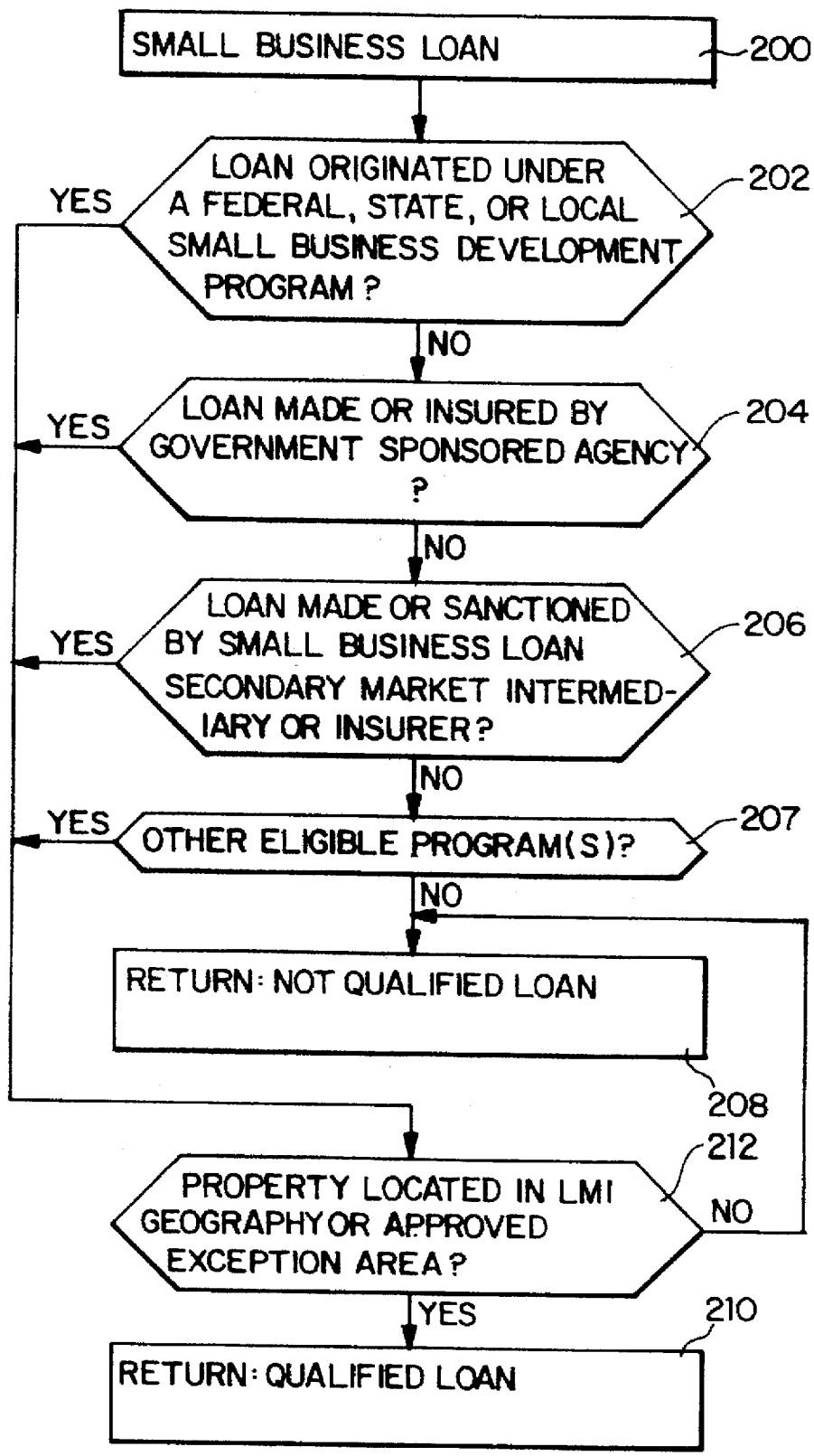
FIG. 6 is a schematic flow diagram showing a method the network may use to determine whether a small business loan is qualified for the network. The schematic flow diagram shown in FIG. 6 may be a subroutine that may be called from the flow diagram shown in FIG. 3.

Turning now to FIG. 6, if appropriate, the network may use the disclosed small business loan CRA approval procedure to determine whether an asset is qualified for the CRA network. As stated above, it is understood that CRA criteria may change from time to time and that such changes and special CRA programs are within the scope of the present invention. The network may determine if the asset is a CRA qualified small business loan as follows. If the loan was originated under a federal, state, or local small business development program 202, and the property is located in a LMI geography or approved exception area 212, then the loan may be CRA qualified 210. If the loan was made or insured by a government sponsored agency 204, and the property is located in a LMI geography or approved exception area 212, then the loan may be CRA qualified 210. If the loan was made or sanctioned by a small business loan secondary market intermediary or insurer 206, and the property is located in a LMI geography or approved exception area 212, then the loan may be CRA qualified 210. If the loan was originated under any other eligible program 207, and the property is located in a LMI geography or approved exception area 212, then the loan may be CRA qualified 210. If the property is not in a LMI geography or approved exception area 212, then the loan may not be CRA qualified 208. If the loan does not meet any of the above criteria then the loan may not be CRA qualified 208.

Figure 7:
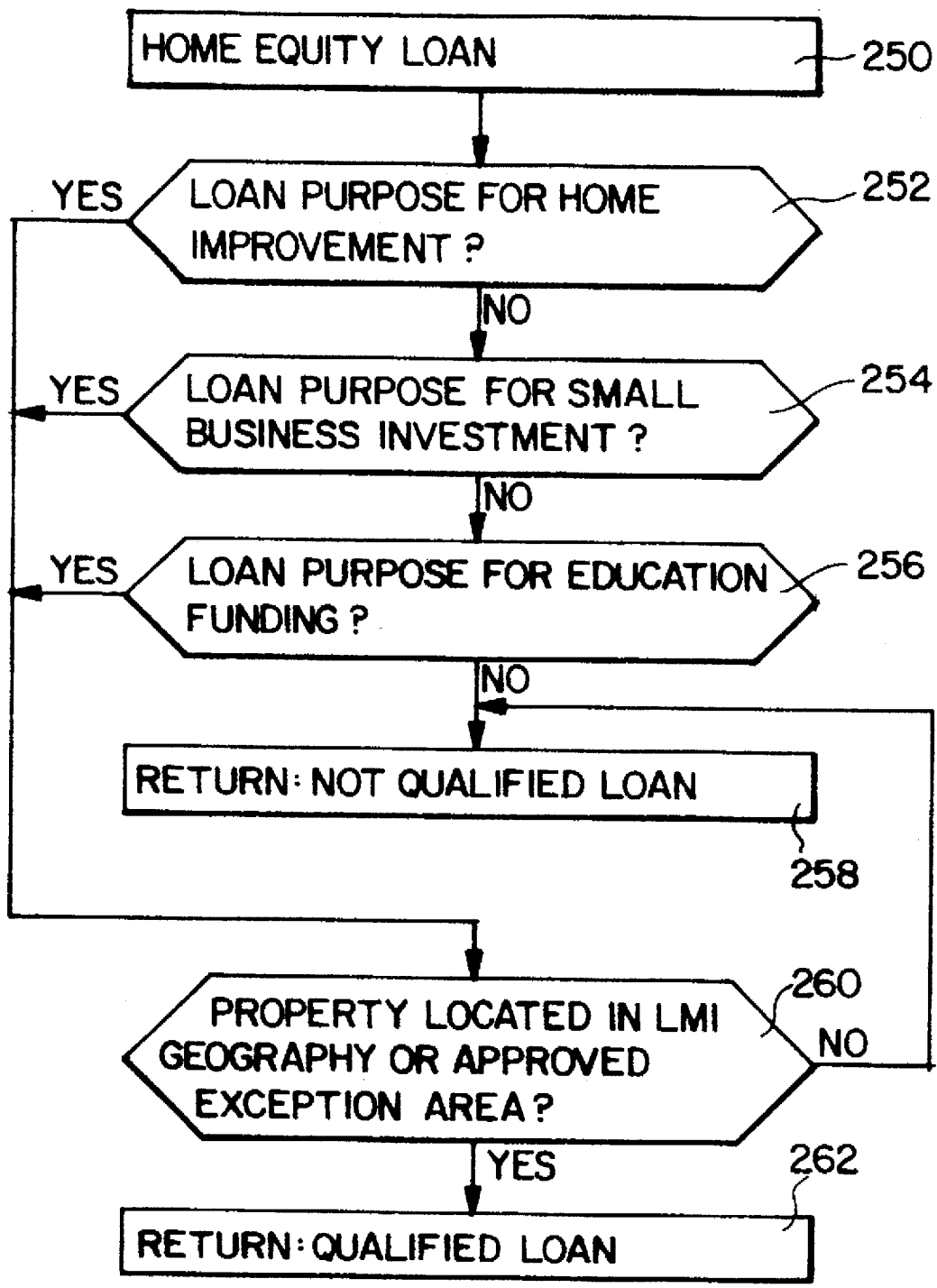
FIG. 7 is a schematic flow diagram showing a method the network may use to determine whether a home equity loan is qualified for the network. The schematic flow diagram shown in FIG. 7 may be a subroutine that may be called from the flow diagram shown in FIG. 3.

Turning now to FIG. 7, if appropriate, the network may use the disclosed home equity loan CRA approval procedure to determine whether an asset is qualified for the CRA. As stated above, it is understood that CRA criteria may change from time to time and that such changes and special CRA programs are within the scope of the present invention. The network may determine if the asset is a CRA qualified home equity loan as follows: If the purpose of the loan is for home improvement 252 and the property is located in a LMI geography or approved exception area 260, then the loan may be CRA qualified 262. If the purpose of the loan is for small business investment 254 and the property is located in a LMI geography or approved exception area 260, then the loan may be CRA qualified 262. If the purpose of the loan is for education funding 256 and the property is located in a LMI geography or approved exception area 260 then the loan may be CRA qualified 262. If the property is not in a LMI geography or approved exception area 260 then the loan may not be CRA qualified 258. If the loan does not meet any of the above criteria then the loan may not be CRA qualified 258.

Figure 8:
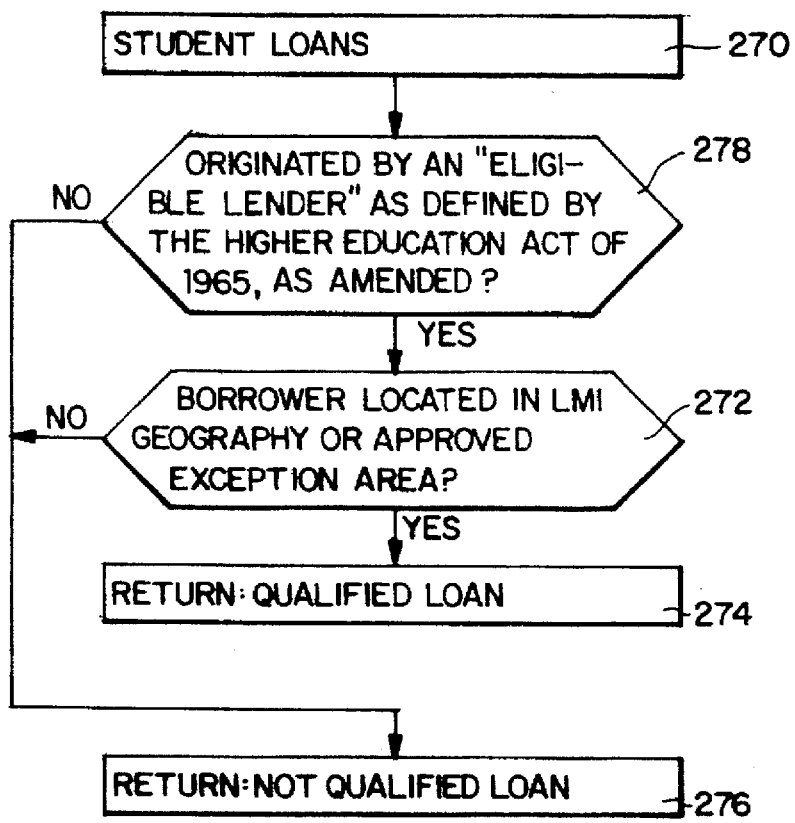
FIG. 8 is a schematic flow diagram showing a method the network may use to determine whether a student loan is qualified for the network. The schematic flow diagram shown in FIG. 8 may be a subroutine that may be called from the flow diagram shown in FIG. 3.

Turning now to FIG. 8, if appropriate, the network may use the disclosed student loan CRA approval procedure to determine whether an asset is qualified for the CRA. As stated above, it is understood that CRA criteria may change from time to time and that such changes and special CRA programs are within the scope of the present invention. The network may determine if the asset is a CRA qualified student loan as follows. The loan was originated by an "eligible lender" as defined by the Higher Education Act of 1965, as amended 278, and the borrower is located in a defined LMI geography or approved exception area 272, then the loan may be CRA qualified 274. If the loan was not originated by an "eligible lender" 278 or if the borrower is not located in a LMI geography or approved exception area 272, then the loan may not be CRA qualified 276.

Figure 9:
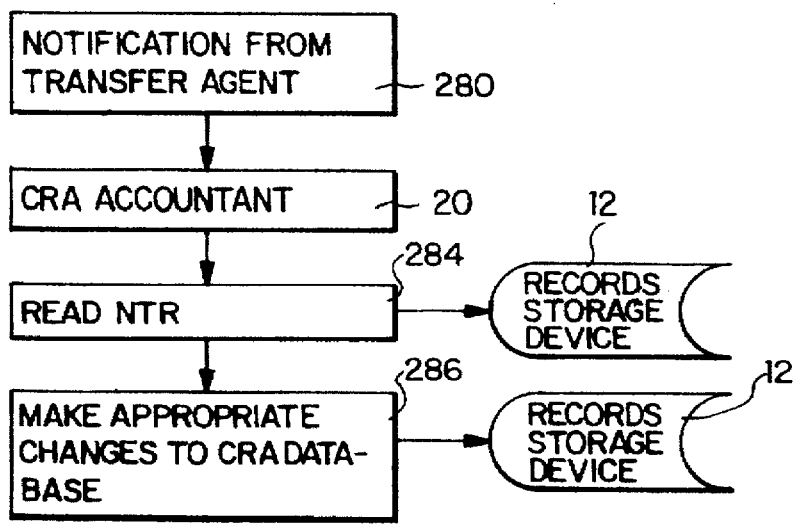
FIG. 9 is a schematic flow diagram of the CRA accountant process and CRA database procedure the network may use to effect distribution of CRA interests. This flow diagram shows an inter-process message from the transfer agent that may be used by the CRA accountant process to update and maintain the CRA database.

FIG. 9 is a schematic diagram of thee CRA accountant 20 processing a notification from the transfer agent 16. The CRA accountant 20 may receive notification that a new transaction has occurred 280. The CRA accountant 20 may read the new transaction record 284 from the records storage device 12. The CRA accountant 20 may make the appropriate changes to the CRA interest database 286 to reflect the network's new CRA interest balance. It is understood that the 4GL implementation of the present invention may use a data field in a data record to indicate the status of a network transaction.

Figure 10B:
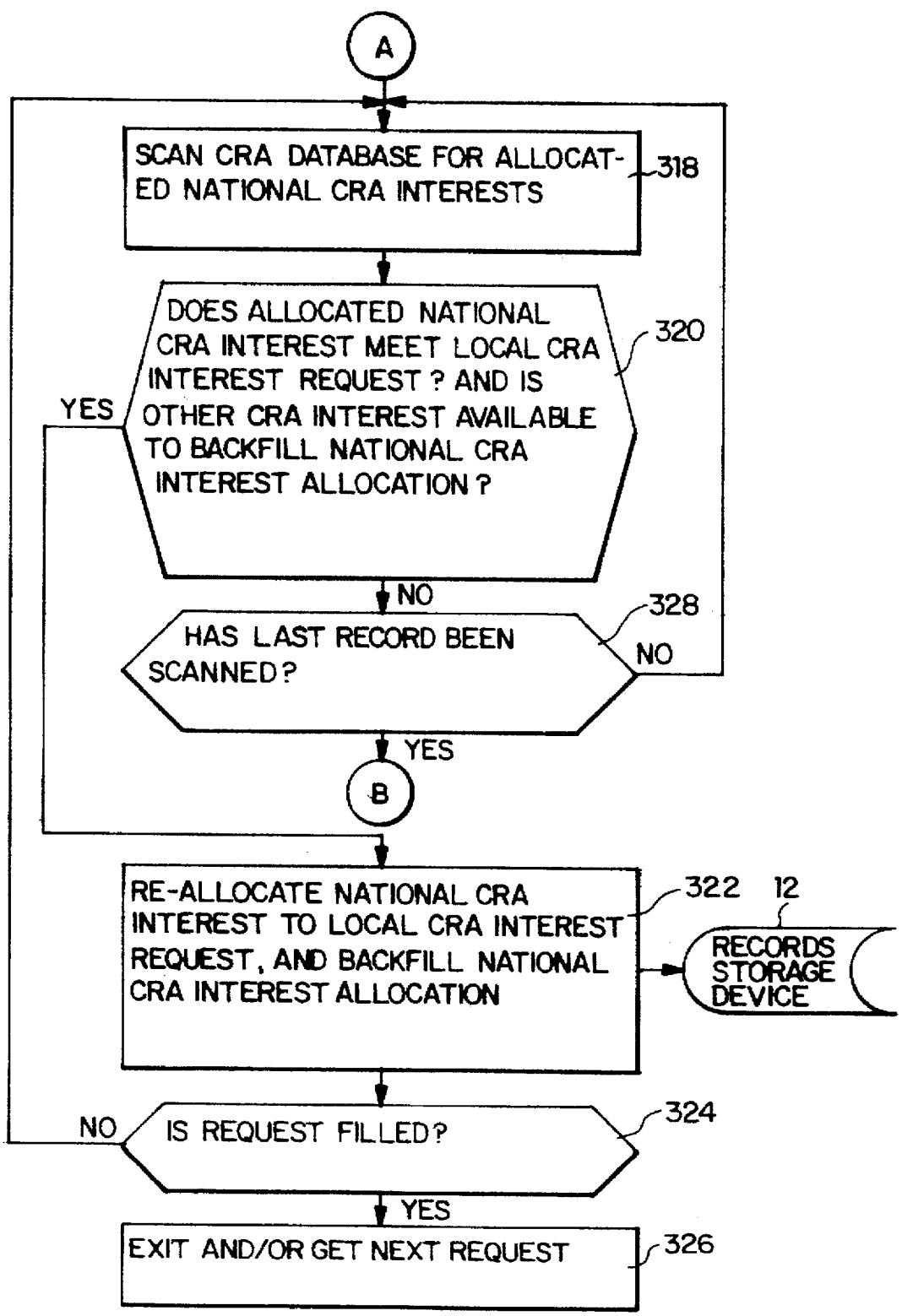
FIG. 10 is a schematic flow diagram showing a method of allocating local CRA interests, allocating national CRA interests, buffering investor requests and CRA interest availability, re-distributing national and local CRA interests, prioritizing CRA requests, and creating and maintaining an audit trail, all of which may be used by the network to effect, control and validate the distribution of CRA interests.

FIG. 10 is a schematic diagram of the procedures the network may use to allocate CRA interest to the shareholders. The CRA accountant 20 may manage all the transactions associated with qualifying assets for the CRA and distributing CRA interest to shareholders. In accord with the previously disclosed CRA accountant functions, CRA interest transactions may be implemented as follows: The CRA accountant 20 may receive a request to allocate CRA interest from a specific portfolio 300. If there are any loan available with CRA interest to allocate 302 and the request is for local CRA interest 304, the CRA accountant 20 may scan the CRA database for the next available unallocated CRA interest record 306. If the asset is located within the requested location 308, then the CRA accountant 20 may allocate the CRA interest to the shareholder account 310. The CRA accountant 20 may record this transaction on the records storage device 12. If the investor's entire CRA request has been filled 312, the CRA accountant may exit and/or proceed to process the next CRA request 314. If the first investor's entire CRA request has not been filled 312, the CRA accountant 20 may again scan the CRA database for the next available unallocated CRA interest record 306. If the asset is not located within the requested location 308, and the last record in the database for unallocated CRA interest has not been scanned 316, the CRA accountant 20 may again scan the CRA database for the next available unallocated CRA interest record 306. It is understood that zip codes and/or census tracts, in accordance with prevailing CRA regulations may be used to determine whether an asset is located within an investor's desired geographic location 308.

If the asset is not located within the requested location 308, and the last record in the database for unallocated CRA interest has been scanned 316, the CRA accountant 20 may scan the database for currently allocated national CRA interests 318. If there exists allocated national CRA interests that may meet the local CRA interest request, and there is other CRA interest available to backfill the national CRA interest allocation 320, then the CRA accountant 20 may reallocate the national CRA interest to meet the local CRA interest request, and backfill the national CRA interest allocation 322. The CRA accountant 20 may record this transaction on the records storage device 12. If the first investor's entire CRA request has not been filled 324, the CRA accountant 20 may again scan the CRA database for allocated national CRA interest records 320. If the allocated national CRA interest does not meet the local CRA interest request and backfill is not available to refill the national CRA interest allocation 320, and the last record in the database for allocated national CRA interests has not been scanned 328, the CRA accountant 20 may again scan the CRA database for allocated national CRA interest records 318.

If the CRA allocation request is not for local CRA interest 304, then it may be a request for regional or national CRA interest 330, and the CRA accountant 20 may scan the CRA database for the next available unallocated CRA interest record 332. If sufficient loans exist to fill the entire request 324, the CRA accountant 20 may allocate the CRA interest to the shareholder account and then exit and/or proceed to process the next CRA interest request 336. The CRA accountant 20 may record this transaction on the records storage device 12.

As noted above, the CRA accountant 20 may allocate CRA interest for an entire asset or only a part of an asset. The CRA accountant 20 may create a new record, a CRA Interest Allocation Record (CRAIAR), on the record storage device 12. The CRAIAR may include the time, date, asset, asset location, asset ownership status, CRA interest, CRA interest allocation, and the like to form a complete audit trail of CRA interest allocations. CRAIAR records may be time and date "stamped" so that CRA audit trails can be readily generated. It is understood that a 4GL database implementation may use data fields in a data record to indicate changes to the status of CRA interest.

If the CRA accountant 20 has scanned the last record for allocated national CRA interests 328, or there are not sufficient loans available to fill a national request 334, or there are no loans available to allocate 302, then the CRA accountant 20 may generate a purchase request record (PRR) and notify the investment advisor 26 of the CRA interest need 338. The CRA accountant 20 may put the unsatisfied CRA request in a waiting queue 340. A CRA accountant 20 sub-process may periodically service the wait queue 342 by generating a new CRA interest request 300 directed to the unsatisfied CRA interest request. As noted above, the investment advisor 26 may use unfulfilled CRA interest requirements to form a basis for buying and selling portfolio assets 30.

While the elements of the CRA network have been described in great detail, it is appreciated by those in the financial computer arts, that the functionality of the processing modules may be reallocated and redistributed among the processing modules and is within the scope of the present invention. Moreover, although the invention has been particularly shown and described with reference to preferred embodiments thereof, it will be understood by those skilled in the art that various changes in form and details may be made therein without departing from the spirit and scope of the invention as defined by the appended claims.

We claim:

1. A computer method of financial interest distribution and cognizable interest distribution based on a pool of assets with a computer automated financial accountant and a parallel computer automated cognizable interest accountant, a database, in a computer system comprising the steps of:

calculating the financial return on a pool of assets based on the financial return of each particular asset in said pool of assets and distributing said financial return to at least one investor by modifying an electronic computer record to indicate a particular financial distribution to said investor for said financial distribution, said computer record being stored in a storage device;

calculating the cognizable interest available from said pool of assets by qualifying each particular asset in said pool of assets for cognizable interest based on predetermined approval criteria wherein said predetermined approval criteria is electronically represented on said storage device so that said cognizable interest is linked to said pool of assets by modifying a computer record on said storage device so that each said cognizable interest can be traced to said particular asset in said pool of assets that qualifies for said cognizable interest; and distributing said cognizable interest derived from said pool of assets to at least one said financial investor in the said pool of assets by modifying a computer record of each cognizable interest transaction in a storage device so that each cognizable interest can be linked to said particular asset in said pool of assets that was used to qualify said particular asset for cognizable interest and to identify when said cognizable interest is distributed to said investor.

2. The method of claim 1 further comprising the steps of:

comparing an asset's characteristics with predetermined qualifying parameters so that an asset can be identified as having a separate cognizable interest;

procuring said qualified asset having said cognizable interest for inclusion in said pool of assets and book on the system;

organizing said pool of assets as an investment company (whether registered under the Investment Company Act of 1940 or exempt therefrom), a trust, a limited liability corporation, a limited partnership, a general partnership, a limited liability partnership, a mutual fund, a REMIC, or an unincorporated association; and managing said pool of assets by buying, selling and holding said assets to maintain said pool of assets within predetermined liquidity and market risk parameters.

3. The method of claim 1 further comprising the steps of:

calculating the financial return on said pool of assets by combining the individual financial gain or loss of each asset within said pool of assets to determine a net gain or loss from said pool of assets;

distributing said net gain or loss from said pool of assets, by modifying a computer record on said storage device, to each said investor on a per share basis;

recording said calculation of said financial return on a computer record, by modifying said computer record on said storage device so that an audit trail of said calculation of said financial return is established; and reporting said calculated financial return on said pool of assets and reporting said distribution of said net gain or loss on said pool of assets to said investors by printing a record of said distribution on a printer that is operatively connected to said computer system.

4. The method of claim 1 further comprising the steps of:

calculating the cognizable interest of each asset by comparing said asset's characteristics to predetermined cognizable interest qualifying criteria, said predetermined cognizable interest qualifying criteria storage in a computer record on said storage device;

assigning said calculated cognizable interest from said asset to said investor in response to said investor's cognizable interest preference factors by modifying a computer record on said storage device to denote the assignment of said cognizable interest;

recording said assignment of said cognizable interest to said investor in a computer record, said computer record providing a link between said calculated cognizable interest and said particular asset and between said calculated cognizable interest and said investor so that an audit trail of said assignment of said cognizable interest is established; and reporting said calculated cognizable interest calculation and said cognizable interest assignment to said investor.

5. The method of claim 1 further comprising the steps of:

calculating the average risk weight of said pool of assets by determining the risk weight of each asset in said pool of assets and averaging said risk weight to determine said average risk weight;

recording said average risk weight calculation on a computer record so that said average risk weight calculation record maintains an audit trail for said average risk weight calculation; and reporting said calculated average risk weight to said investors.

6. The method of claim 3 further comprising the step of:

recalculating said financial return on said pool of assets and redistributing said recalculated financial return in response to the acquisition or disposition of any asset said redistribution of said recalculated financial return performed by modifying a computer record on said storage device to denote said redistribution.

7. The method of claim 4 further comprising the step of:

recalculating and reassigning said cognizable interest assignment to said investor in response to the acquisition or disposition of any asset, said reassigning of said cognizable interest performed by modifying a computer record on said storage device to denote said redistribution.

8. The method of claim 5 further comprising the step of:

recalculating said average risk weight of said pool of assets in response to the acquisition or disposition of any asset.

9. The method of claim 1 further comprising the step of:

recalculating and redistributing said financial return of said pool of assets to said investors by modifying a computer record on said storage device in response to an investor's increased or decreased holding in said pool of assets.

10. The method of claim 1 further comprising the step of:

reallocating said cognizable interest to said investors by modifying a computer record on said storage device in response to an investor's increased or decreased holding in said pool of assets.

11. The method of claim 1 wherein:

said cognizable interest is a CRA interest; and said step of distributing is based on said investor's CRA requirements.

12. A computer method of interest distribution based on a pool of assets with a computer automated financial accountant and a parallel computer automated CRA interest accountant, a database, and a computer system comprising the steps of:

calculating the financial return on a pool of assets based on the financial return of each particular asset in said pool of assets and distributing said financial return to at least one investor by modifying an electronic computer record to indicate a particular financial distribution to said investor for said financial distribution, said computer record being stored in a storage device;

calculating the CRA interest available from said pool of assets by qualifying each particular asset in said pool of assets for CRA interest based on predetermined approval criteria wherein said predetermined approval criteria is electronically represented on said storage device so that said CRA interest is linked to said pool of assets by modifying a computer record on said storage device so that each said CRA interest can be traced to said particular asset in said pool of assets that qualifies for said CRA interest; and distributing said CRA interest derived from said pool of assets to at least one said financial investor in the pool by modifying a computer record of each CRA interest transaction in a storage device so that each CRA interest can be linked to said particular asset in said pool of assets that was used to qualify said particular asset for CRA interest and to identify when said CRA interest is distributed to said investor.

13. The method of claim 12 further comprising the steps of:

comparing an asset's characteristics with predetermined qualifying parameters so that an asset can be identified as having a separate CRA interest;

procuring said qualified asset having said CRA interest for inclusion in said pool of assets and book on the system;

organizing said pool of assets as an investment company (whether registered under the Investment Company Act of 1940 or exempt therefrom), a trust, a limited liability corporation, a limited partnership, a general partnership, a limited liability partnership, a mutual fund, a REMIC, or an unincorporated association; and managing said pool of assets by buying, selling and holding said assets to maintain said pool of assets within predetermined liquidity and market risk parameters.

14. The method of claim 12 further comprising the steps of:

calculating the financial return on said pool of assets by combining the individual financial gain or loss of each asset within said pool of assets to determine a net gain or loss from said pool of assets;

distributing said net gain or loss from said pool of assets, by modifying a computer record on said storage device, to each said investor on a per share basis;

recording said calculation of said financial return on a computer record, by modifying said computer record on said storage device so that an audit trail of said calculation of said financial return is established; and reporting said calculated financial return on said pool of assets and reporting said distribution of said net gain or loss on said pool of assets to said investors by printing a record of said distribution on a printer that is operatively connected to said computer system.

15. The method of claim 12 further comprising the steps of:

calculating the CRA interest of each asset by comparing said assets characteristics to predetermined CRA interest qualifying criteria, said predetermined cognizable interest qualifying criteria storage in a computer record on said storage device;

assigning said calculated CRA interest from said asset to said investor in response to said investor's CRA interest preference factors by modifying a computer record on said storage device to denote the assignment of said cognizable interest;

recording said assignment of said CRA interest to said investor in a computer record, said computer record providing a link between said calculated CRA interest and said particular asset and between said calculated CRA interest and said investor, and so that an audit trail of said assignment of said CRA interest is established; and reporting said calculated CRA interest calculation and said CRA interest assignment to said investor.

16. The method of claim 12 further comprising the steps of:

calculating the average risk weight of said pool of assets by determining the risk weight of each asset in said pool of assets and averaging said risk weight to determine said average risk weight;

recording said average risk weight calculation on a computer record so that said average risk weight calculation record maintains an audit trail for said average risk weight calculation; and reporting said calculated average risk weight to said investors.

17. The method of claim 14 further comprising the step of:

recalculating said financial return on said pool of assets and redistributing said recalculated financial return in response to the acquisition or disposition of any asset said redistribution of said recalculated return performed by modifying a computer record on said storage device to denote said redistribution.

18. The method of claim 15 further comprising the step of:

recalculating and reassigning said CRA interest assignment to said investor in response to the acquisition or disposition of any asset, said reassigning of said CRA interest performed by modifying a computer record on said storage device to denote said redistribution.

19. The method of claim 16 further comprising the step of:

recalculating said average risk weight of said pool of assets in response to the acquisition or disposition of any asset.

20. The method of claim 12 further comprising the step of:

recalculating and redistributing said financial return of said pool of assets to said investors by modifying a computer record on said storage device in response to an investor's increased or decreased holding in said pool of assets.

21. The method of claim 12 further comprising the step of:

reallocating said CRA interest to said investors by modifying a computer record on said storage device in response to an investor's increased or decreased holding in said pool of assets.

22. A cognizable interest transaction apparatus to allocate financial returns to investor accounts and to separately allocate a cognizable interest from a managed pool of assets to said investor accounts comprising:

a control terminal for operating the cognizable interest transaction apparatus;

a processor coupled to said control terminal for processing transaction instructions respecting the cognizable interest transaction apparatus and maintaining account status information;

said processor modifying computer records of a portfolio of cognizable interest eligible assets and modifying computer records of investor accounts including share accounts, financial transactions and cognizable interest transactions; and said processor modifying computer records to establish a cognizable interest eligible portfolio, said processor determining portfolio share price and modifying computer records to allocate said cognizable interest to said investor accounts.

23. The apparatus of claim 22 further comprising:

a printer operably connected to said processor, said printer for printing information in response to data from said processor.

24. The apparatus of claim 22 wherein:

said control terminal provides an operator interface to the transaction network for monitoring, approving, or directing transactions within said transaction network.

25. The apparatus of claim 22 wherein:

an operator at said control terminal can direct said transaction network to monitor, approve, or direct a cognizable interest transaction, a financial transaction or an asset transaction by commanding said transaction network to modify computer records.

26. The apparatus of claim 22 wherein:

said processor in response to a command signal from said control terminal generates an audit trail, said audit trail providing a record of said cognizable interest transactions and said financial transactions.

27. The apparatus of claim 22 wherein said cognizable interest portfolio comprises:

a pool of assets that satisfies a first set of predetermined parameters that qualifies an asset as eligible for said cognizable interest, a second set of predetermined parameters that qualifies an asset as within a predetermined financial risk category, and a third set of predetermined parameters that qualifies an asset as satisfying a specific investor's cognizable interest and financial requirements.

28. The apparatus of claim 22 further comprising:

said processor managing said pool of assets by modifying computer records to denote the buying, selling, and holding said assets to maintain said pool of assets within predetermined liquidity and market risk parameters.

29. The apparatus of claim 22 wherein:

said processor determining the average risk weight of said portfolio, said processor modifying computer records on said storage device to notify said investor accounts of said average risk weight.

30. The apparatus of claim 22 wherein:

said means for maintaining records is a computer database.

31. The apparatus of claim 22 wherein:

said cognizable interest is a CRA interest; and said processor allocating said CRA interest to said investor accounts by modifying computer records on said storage device based on said investors' CRA requirement.

32. A CRA interest transaction apparatus to allocate financial returns to investor accounts and to separately allocate a CRA interest from a managed pool of assets to said investor accounts comprising:

a control terminal for operating the CRA interest transaction apparatus;

a processor coupled to said control terminal for processing transaction instructions respecting the CRA interest transaction apparatus and maintaining account status information;

said processor modifying computer records of a portfolio of CRA interest eligible assets and modifying computer records of investor accounts including share accounts, financial transactions and CRA interest transactions; and said processor modifying computer records to establish a CRA interest eligible portfolio, said processor determining portfolio share price and modifying computer records to allocate said CRA interest to said investor accounts.

33. The apparatus of claim 32 further comprising:

a printer operably connected to said processor, said printer for printing information in response to data from said processor.

34. The apparatus of claim 32 wherein:

said control terminal provides an operator interface to the transaction network for monitoring, approving, or directing transactions within said transaction network.

35. The apparatus of claim 32 wherein:

an operator at said control terminal can direct said transaction network to monitor, approve, or direct a CRA interest transaction, a financial transaction or an asset transaction by commanding said transaction network to modify computer records.

36. The apparatus of claim 32 wherein:

said processor in response to a command signal from said control terminal generates an audit trail, said audit trail providing a record of said CRA interest transactions and said financial transactions.

37. The apparatus of claim 32 wherein said CRA interest portfolio comprises:

a pool of assets that satisfies a first set of predetermined parameters that qualifies an asset as eligible for said CRA interest, a second set of predetermined parameters that qualifies an asset as within a predetermined financial risk category, and a third set of predetermined parameters that qualifies an asset as satisfying a specific investor's CRA interest and financial requirements.

38. The apparatus of claim 32 further comprising:

said processor managing said pool of assets by modifying computer records to denote the buying, selling, and holding said assets to maintain said pool of assets within predetermined liquidity and market risk parameters.

39. The apparatus of claim 37 wherein:

said first set of predetermined parameters are CRA qualifying parameters;

said second set of predetermined parameters are used by said means for managing said pool of assets to determine whether to buy, sell, or hold said asset for said pool of assets; and said third set of predetermined parameters are CRA requirements determined by parameters in said investor accounts.

40. The apparatus of claim 32 wherein:

said processor determining the average risk weight of said portfolio, said processor modifying computer records on said storage device to notify said investor accounts of said average risk weight.

41. The apparatus of claim 32 wherein:

said means for maintaining records is a computer database.

42. A financial and cognizable interest transaction network apparatus based on a managed pool of assets and a computer processor comprising:

a client service administrator establishing an investor account through the modification of a computer record, said client service administrator providing a command interface to command said transaction network to increase or decrease an investor's financial holding in the network and to specify an investor's desired geographic area from which to acquire cognizable interest;

a data storage device operationally connected to said client service administrator, said data storage device for maintaining computer records of said investor account;

a cognizable interest accountant operably connected to said data storage device, said cognizable interest accountant operatively connected to said client service administrator, said cognizable interest accountant determining the cognizable interest of assets within said pool of assets represented by computer records, said cognizable interest accountant allocating said cognizable interest to said investor account by modifying computer records of said investor accounts;

a transfer agent linked to said data storage device and said cognizable interest accountant, said transfer agent conducting transactions by book entry by modifying computer records to denote said transactions, said transfer agent buying and selling assets for said pool of assets;

a financial accountant linked to said transfer agent, said financial accountant operating in parallel with said cognizable interest accountant, said financial accountant determining said pool of assets' share price and said financial accountant providing means for distributing a financial return from said pool of assets to said investor account;

an investment advisor linked to said transfer agent, said financial accountant and said cognizable interest accountant, said investment advisor providing means for determining appropriate assets to buy or sell to maintain said pool of assets within a predetermined range of financial risk while maintaining a cognizable interest balance to substantially fulfill the cognizable interest demand from said investor account; and a custodian linked to said transfer agent, said custodian providing means for receiving assets purchased by said transfer agent and acknowledging receipt thereof.

43. The apparatus of claim 42 wherein:

said financial accountant calculates the financial return on a pool of assets based on the financial return of each particular asset in said pool of assets and distributes said financial return to said investor account so that a computer record that indicates a particular financial distribution to said investor account is created for said financial distribution, said computer record being stored in said storage device;

said cognizable interest accountant calculates the cognizable interest available from said pool of assets by qualifying each particular asset in said pool of assets for an amount of cognizable interest based on predetermined approval criteria so that said cognizable interest is linked to said pool of assets with a computer record so that each said cognizable interest can be traced to said particular asset in said pool of assets that qualifies for said cognizable interest; and said cognizable interest accountant distributes said cognizable interest derived from said pool of assets to said investor account by maintaining a computer record of each cognizable interest transaction in said storage device so that each cognizable interest can be linked to said particular asset in said pool of assets that was used to qualify said particular asset for cognizable interest to said investor account.

44. The apparatus of claim 42 wherein:

said financial accountant calculates the average risk weight of said pool of assets by averaging the risk of each particular asset in said pool of assets, said financial accountant notifying said investor account of said average risk weight.

45. The apparatus of claim 42 further comprising:

a printer operably connected to said client service administrator, said printer capable of printing information in response to data from said client service administrator.

46. The apparatus of claim 42 wherein:

said client service administrator in response to a command from said control terminal is capable of generating an audit trail of said cognizable interest transactions and said financial transactions from computer records of said transaction stored on said storage device.

47. The apparatus of claim 42 further comprising:

a control terminal operably connected to said investment advisor, said control terminal providing operator means for monitoring, approving or directing the buying and selling of assets in said pool of assets.

48. The apparatus of claim 42 further comprising:

a control terminal operably connected to said transfer agent, said control terminal providing operator means for monitoring, approving or directing transactions on said transaction network.

49. The apparatus of claim 42 wherein:

said cognizable interest is a CRA interest; and said cognizable interest accountant including means for allocating said CRA interest to said investor account based on the investor's CRA requirement.

50. The apparatus of claim 42 further comprising:

an electronic interface to operably link said transfer agent to an external secondary market, said external secondary market created by a market maker for electronically buying and selling assets.

51. The apparatus of claim 42 further comprising:

an electronic interface to operably link said transfer agent to an external electronic funds transfer network, said interface electronically sending and receiving funds.

52. A financial and CRA interest transaction network apparatus based on a managed pool of assets and a computer processor comprising:

a client service administrator establishing an investor account through the modification of a computer record, said client service administrator providing a command interface to command said transaction network to increase or decrease an investor's financial holding in the network and to specify an investor's desired geographic area from which to acquire CRA interest;

a data storage device operationally connected to said client service administrator, said data storage device for maintaining computer records of said investor account;

a CRA interest accountant operably connected to said data storage device, said CRA interest accountant operatively connected to said client service administrator, said CRA interest accountant determining the CRA interest of assets represented by computer records, said CRA interest accountant allocating said CRA interests to said investor account by modifying computer records of said investor account;

a transfer agent linked to said data storage device and said client service administrator, said transfer agent conducting transactions by book entry by modifying computer records to denote said transactions, said transfer agent buying and selling assets for said pool of assets;

a financial accountant linked to said transfer agent, said financial accountant operating in parallel with said CRA interest accountant, said financial accountant determining said pool of assets' share price and said financial accountant providing means for distributing a financial return from said pool of assets to said investor account;

an investment advisor linked to said transfer agent, said financial accountant and said CRA accountant, said investment advisor providing means for determining appropriate assets to buy or sell to maintain said pool of assets within a predetermined range of financial risk while maintaining a CRA interest balance to substantially fulfill the CRA interest demand from said investor account; and a custodian linked to said transfer agent, said custodian providing means for receiving assets purchased by said transfer agent and acknowledging receipt thereof.

53. The apparatus of claim 52 wherein:

said financial accountant calculates the financial return on said pool of assets based on the financial return of each particular asset in said pool of assets and distributing said financial return to said investor account so that a computer record that indicates a particular financial distribution to said investor account is created for said financial distribution, said computer record being stored in said storage device;

said CRA interest accountant calculates the CRA interest available from said pool of assets by qualifying each particular asset in said pool of assets for an amount of CRA interest based on predetermined approval criteria so that said CRA interest is linked to said pool of assets with a computer record so that each said CRA interest can be traced to said particular asset in said pool of assets that qualifies for said CRA interest; and said CRA interest accountant distributes said CRA interest derived from said pool of assets to said investor account by maintaining a computer record of each CRA interest transaction in said storage device so that each CRA interest can be linked to said particular asset in said pool of assets that was used to qualify said particular asset for CRA interest to said investor account.

54. The apparatus of claim 52 wherein:

said financial accountant calculates the average risk weight of said pool of assets by averaging the risk of each particular asset in said pool of assets, said financial accountant notifying said investor account of said average risk weight.

55. The apparatus of claim 52 further comprising:

a printer operably connected to said client service administrator, said printer capable of printing information in response to data from said client service administrator.

56. The apparatus of claim 52 wherein:

said client service administrator in response to a command from said control terminal is capable of generating an audit trail of said CRA interest transactions and said financial transactions from computer records of said respective transactions stored on said storage device.

57. The apparatus of claim 52 further comprising:

a control terminal operably connected to said investment advisor, said control terminal providing operator means for monitoring, approving or directing the buying and selling of assets in said pool of assets.

58. The apparatus of claim 52 further comprising:

a control terminal operably connected to said transfer agent, said control terminal providing operator means for monitoring, approving or directing transactions on said transaction network.

* * * * *